United States Patent [19]

Davidson et al.

[11] Patent Number: 4,820,041

[45] Date of Patent: Apr. 11, 1989

[54] POSITION SENSING SYSTEM FOR SURVEYING AND GRADING

[75] Inventors: Richard W. Davidson, Dublin; John W. Fletcher, Pleasanton, both of Calif.

[73] Assignee: Agtek Development Co., Inc., Livermore, Calif.

[21] Appl. No.: 930,792

[22] Filed: Nov. 12, 1986

[51] Int. Cl.⁴ .................. G01C 3/20; G01C 15/06; G01B 11/26; E02F 3/76

[52] U.S. Cl. .......................................... 356/1; 33/293; 33/294; 33/296; 172/4.5; 180/168; 342/53; 342/54; 356/141; 356/152; 356/399; 364/456; 364/424.07

[58] Field of Search ............. 356/1, 5, 141, 152, 356/9, 15, 17, 146, 399; 33/293, 294, 296; 172/4.5; 342/53, 54; 180/167, 168; 364/167, 168, 424, 449, 456

[56] References Cited

U.S. PATENT DOCUMENTS

| | | |
|---|---|---|
| 2,973,593 | 3/1961 | Zellner et al. |
| 3,046,681 | 7/1962 | Kutzler |
| 3,400,398 | 9/1968 | Lapeyre et al. |
| 3,447,129 | 5/1969 | Birmingham et al. |
| 3,452,207 | 6/1969 | Tsukkerman ............ 172/4.5 |
| 3,462,845 | 8/1969 | Matthews ............ 172/4.5 X |
| 3,469,919 | 9/1969 | Zellner ...................... 356/4 |
| 3,471,234 | 10/1969 | Studebaker ................ 356/3 |
| 3,494,426 | 2/1970 | Studebaker ............. 172/4.5 |
| 3,554,291 | 1/1971 | Rogers ................... 172/4.5 |
| 3,588,249 | 6/1971 | Studebaker ............... 356/4 |
| 3,588,255 | 6/1971 | Alexander ............. 356/153 |
| 3,602,572 | 8/1971 | Norris, Jr. .............. 350/6.8 |
| 3,680,958 | 8/1972 | Von Bose ............... 356/141 |
| 3,687,556 | 8/1972 | Price et al. ............. 356/152 |
| 3,790,277 | 2/1974 | Hogan ................... 356/152 |
| 3,791,452 | 2/1974 | Long et al. ............. 172/4.5 |
| 3,813,171 | 5/1974 | Teach et al. ........... 356/152 |
| 3,819,273 | 6/1974 | Unema et al. .......... 356/152 |
| 3,846,026 | 11/1974 | Waters ................... 356/152 |
| 3,894,230 | 7/1975 | Rorden et al. ........ 250/203 R |
| 3,972,622 | 8/1976 | Mason et al. ........... 356/152 |
| 4,029,415 | 1/1977 | Johnson .................... 356/1 |
| 4,030,832 | 6/1977 | Rando et al. ........... 356/152 |
| 4,047,816 | 9/1977 | Pell et al. .............. 356/152 |
| 4,162,708 | 7/1979 | Johnson ................. 172/4.5 |
| 4,200,787 | 4/1980 | Carson .................. 172/4.5 |
| 4,240,208 | 12/1980 | Pehrson ................... 33/293 |
| 4,244,123 | 1/1981 | Lazure et al. ............ 37/193 |
| 4,273,196 | 6/1981 | Etsusaki et al. ........ 172/4.5 |
| 4,537,259 | 8/1985 | Funabashi et al. ...... 172/4.5 |
| 4,653,910 | 3/1987 | Poling ................... 356/152 |
| 4,676,634 | 6/1987 | Petersen ................ 356/152 |
| 4,681,433 | 7/1987 | Aeschlimann ............. 356/5 |
| 4,700,301 | 10/1987 | Dyke ........................ 356/1 |

Primary Examiner—Stephen C. Buczinski
Assistant Examiner—Linda J. Wallace
Attorney, Agent, or Firm—Limbach, Limbach & Sutton

[57] ABSTRACT

A position sensing apparatus and method useful for surveying, marking, and grading implement sensing and control is disclosed. The position sensing apparatus includes two laser reference stations, each of which projects a laser beam that periodically sweeps in a plane across the area to be surveyed. Each time a laser beam strikes the opposite reference station, a radio timing signal is broadcast by that reference station. The position sensing apparatus also includes a portable sensing station that comprises a laser beam receiver, a radio reciever, and a programmed computer. The planar position of the portable sensing station relative to the reference stations is computed by a triangulation technique based on the relative timing of detection of the laser beams by the laser beam receiver and the reception of the radio timing signals by the radio receiver. Elevation is determined according to the height at which one of the laser beams strikes the laser beam receiver.

91 Claims, 10 Drawing Sheets

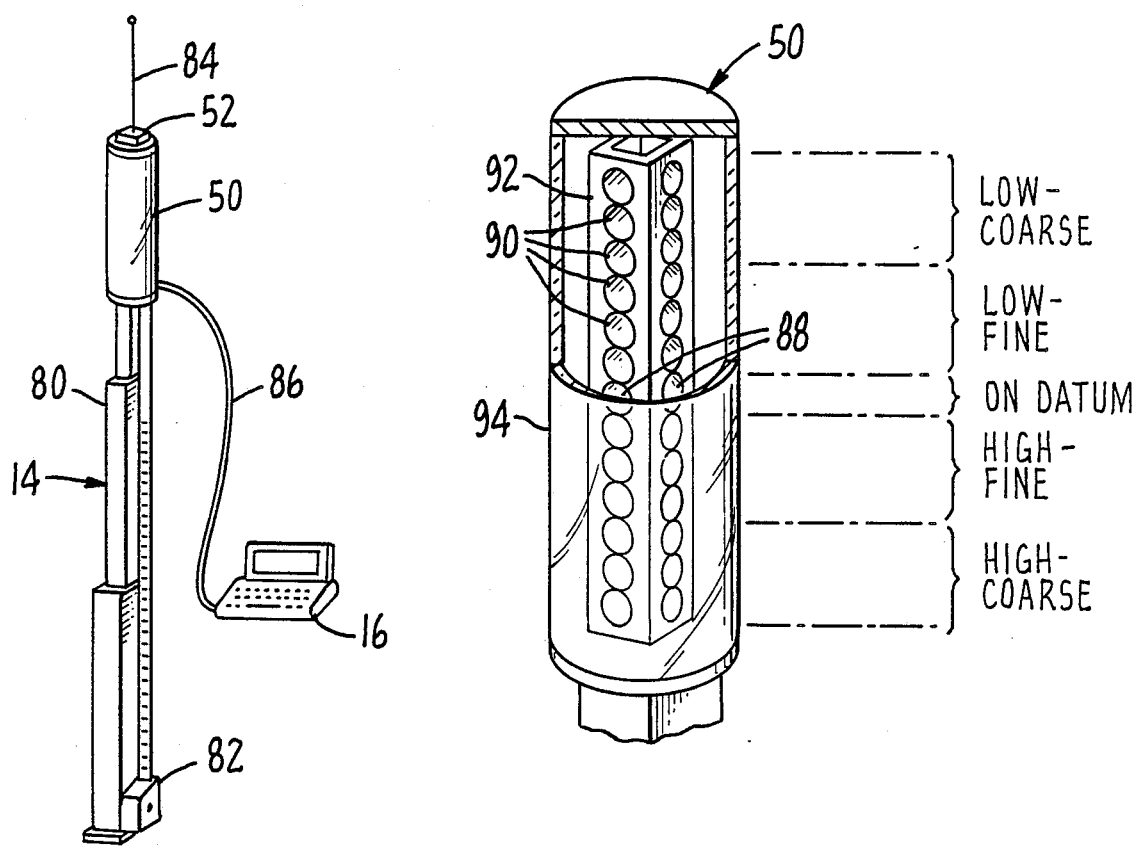
FIG. 6.
FIG. 7.
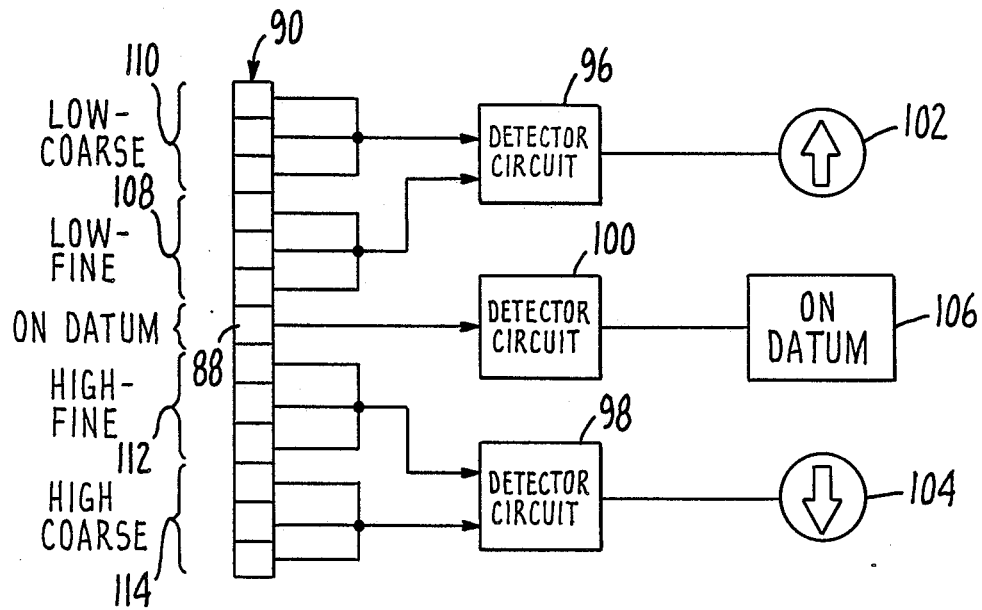
FIG. 8.

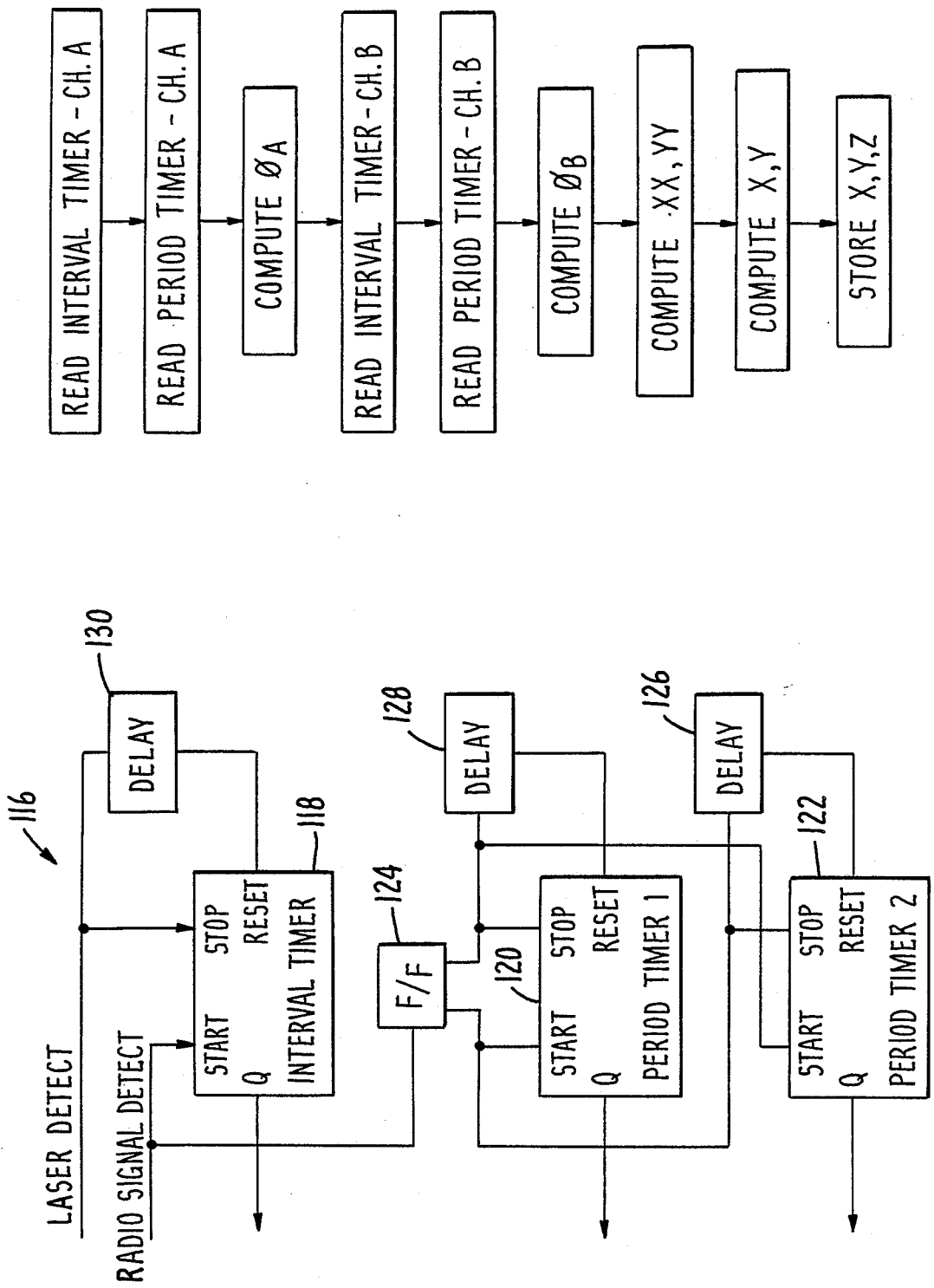

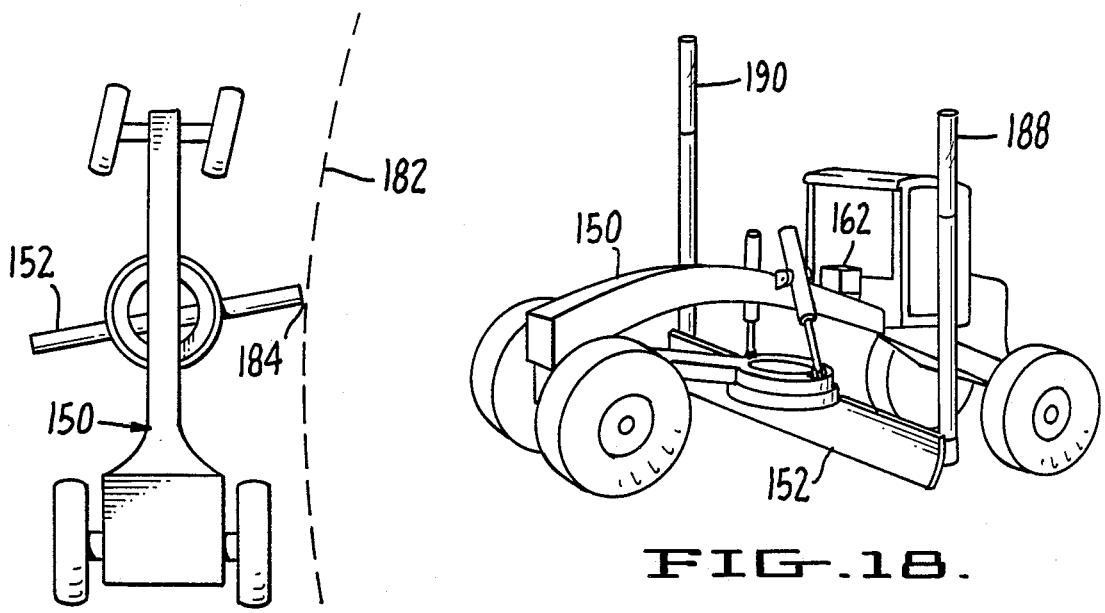
FIG. 17.
FIG. 18.
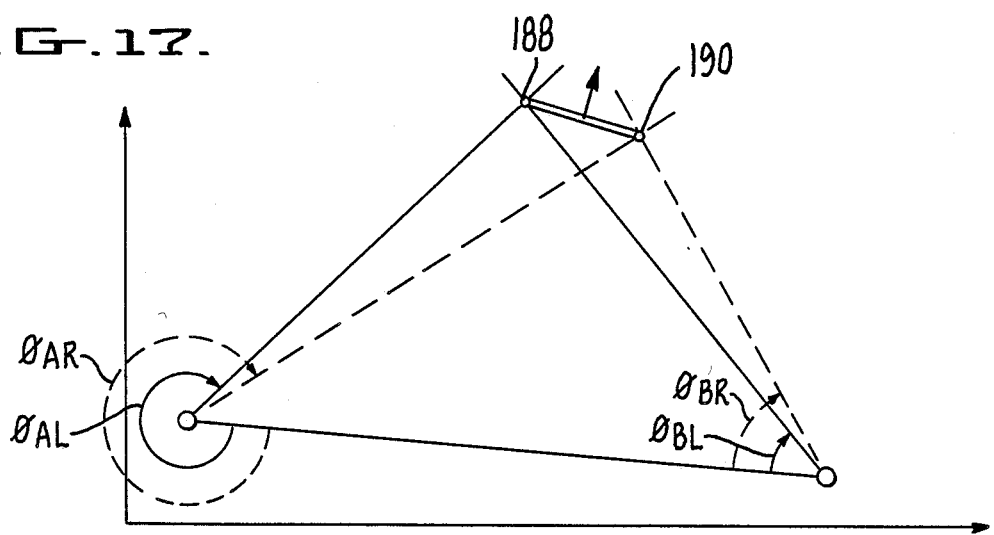
FIG. 19.
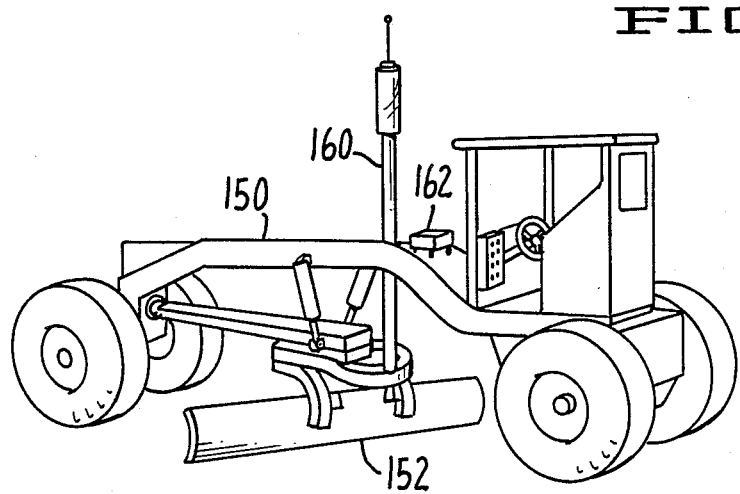
FIG. 20.

POSITION SENSING SYSTEM FOR SURVEYING AND GRADING

BACKGROUND OF THE INVENTION

1. Field of the Invention

This invention relates generally to surveying apparatus and earth-grading machinery, and relates more particularly to three-dimensional position sensing apparatus and methods that utilize laser reference stations and one or more portable position sensors.

2. Description of the Relevant Art

According to conventional practice, the process of transforming a tract of land into a graded surface involves several tasks, typically beginning with the task of surveying the land in order to create a contour map or other graphical representation of the pre-existing state of the land. Surveying involves the delineation of the form, extent, and position of the tract of land based on linear and angular measurements of the land. According to conventional practice, surveying is at least a two person job, with one person operating a measuring instrument from a generally stationary position and the other person transporting and positioning a grade rod or other reference to be sighted by the measuring instrument. The measuring instrument, such as a transit, theodolite, distance meter, or total station, is positioned at a known distance and angle from a reference, or bench mark, position. The grade rod is sequentially positioned at one or more locations, and at each such location, the distance and angle of the grade rod with respect to the position of the measuring instrument is determined and recorded. Distances may be measured manually with a steel tape or chain, or may be measured optically by the measuring instrument utilizing various means such as a retroreflector on the grade rod. Angles are typically measured in both horizontal and vertical planes, with an azimuth angle defined as the horizontal angle measured clockwise from north, and a zenith angle defined as the vertical angle measured downward from the vertical.

From the distance and angle information obtained in the survey, and through application of the principles of geometry and trigonometry, the surface of the tract of land can be characterized and presented in graphical form. The position or location of any point on the tract of land can be represented in a variety of three-dimensional coordinate systems such as X,Y,Z, or R,Θ,Z, where X,Y,Z denotes a Cartesian coordinate system in which the X-Y plane is horizontal and the Z axis is vertical, and where R,Θ,Z denotes a cylindrical coordinate system in which the R-Θ plane is horizontal and the Z axis is vertical. The X,Y or R,Θ coordinates are measured in a horizontal plane with respect to some bench mark position, while the Z coordinate is the elevation measured with respect to some horizontal reference plane, such as mean sea level.

After the tract of land has been surveyed, a site plan can be drawn up to define what the contours and elevations of the land should be after grading. In accordance with conventional practices, the site is then marked with stakes in order to guide the operators of earth-moving equipment while they grade the land into conformity with the site plan. The process of marking involves first defining on the site plan the coordinates of various key locations to be marked, and then placing stakes on the land at those locations. The task of marking the land can utilize the same surveying apparatus described above. The grade rod is roughly positioned near a location to be marked, and its position is determined by the measuring instrument. If the grade rod is not exactly positioned at the location to be marked, the position is noted and the grade rod is repositioned and remeasured until the measuring instrument verifies that the grade rod is positioned at the location to be marked. A stake or other marker is then driven into the ground at that point. Like surveying, the process of marking a tract of land is also a task that requires at least two trained people.

In order to designate the desired elevation at the marked locations, the stakes are typically marked with indications of the depth of fill or cut needed to create the desired graded surface at those locations. Such fill or cut information can be determined according to the elevational differences between the contour map of the existing site and the site plan.

After the tract of land has been marked, earth-moving equipment can be used for grading the site. The operators of the earth-moving equipment are guided by the marker stakes in determining where to cut and where to fill. Care must be exercised to avoid damaging the stakes during the grading operation. The site may need to be re-surveyed during or after completion of the grading to verify the accuracy of the graded surface. With the necessary tasks of surveying, marking, and resurveying, the convention practice of transforming a tract of land into a graded surface is unavoidably labor intensive, even apart from the actual grading operations.

SUMMARY OF THE INVENTION

In accordance with the illustrated preferred embodiment, the present invention provides a three-dimensional position sensing system utilizing two or more stationary laser reference stations and one or more portable position sensors. The position of the portable position sensor is determined by means associated with the portable position sensor by measuring the angular position of the portable position sensor with respect to each laser reference station. The position sensing system of the present invention encompasses a reference station apparatus, a portable sensing station apparatus, a surveying apparatus and method, a marking apparatus and method, a grading implement sensing apparatus and method, and a grading implement control apparatus and method, all of which have certain apparatus and method steps in common, and all of which are useful in transforming a tract of land into a graded surface.

One aspect of the present invention is a position sensing system comprising both apparatus and method for determining the position of one or more locations. The apparatus includes: a first energy beam transmitter that is operable for projecting a first energy beam that sweeps across an area in which position sensing is to occur, first reference signal means for generating a first reference signal when the first energy beam is aligned with a first reference line, a second energy beam transmitter that is operable for projecting a second energy beam that sweeps across the area, wherein the first and second energy beam transmitters are positioned apart during a position sensing operation, second reference signal means for generating a second reference signal when the second energy beam is aligned with a second reference line, an energy beam receiver that is operable for detecting the first and second energy beams and that is sequentially positioned at each location at which the position is to be sensed, a reference signal receiver that is operable for receiving the first and second reference signals, and processing means coupled to the energy beam and reference signal receivers and responsive to the timing of the detection of the energy beams relative to the receipt of the reference signals for determining the position of the energy beam receiver relative to the reference lines and the energy beam transmitters in the plane of the energy beams.

The position sensing method includes the steps of: projecting first and second energy beams from the two energy beam transmitters, wherein each of the energy beams periodically sweeps across the area in which position sensing is to occur, generating a first reference signal when the first energy beam is aligned with a first reference line, generating a second reference signal when the second energy beam is aligned with a second reference line, detecting the first and second energy beams with the energy beam receiver when positioned at a location to be sensed, receiving the first and second reference signals by the reference signal receiver, and determining the position of the energy beam receiver relative to the reference lines and the transmitters in the plane of the energy beams according to the timing of detection of the energy beams by the energy beam receiver relative to the reception of the reference signals by the reference signal receiver.

In the position sensing system, each reference signal means is preferably mounted on the opposite energy beam transmitter, so that the reference lines coincide and extend between the transmitters. Likewise, the energy beam receiver, reference signal receiver, and processing means are preferably packaged together into a portable, position-sensing station. Also preferably, the position of the energy beam receiver in the plane of rotation of the energy beams is determined by a triangulation technique, by finding the angular position of the energy beam receiver relative to the reference line with the two transmitters located at the vertices of the two angles. Each angle is determined according to the ratio of two time intervals, where the first time interval is measured between the detection of an energy beam by the energy beam receiver and the receipt of the corresponding reference signal by the reference signal receiver and the second time interval is equal to the rotational period of the energy beam, which is measured between the receipt of two succeeding reference signals. In other words, if the first time interval is equal to one-eighth of the period of revolution of the energy beam, then the angle is 360°/8, or 45°. The positions of the reference stations and the separation distance therebetween in the plane of the energy beams can be determined through a calibration procedure by position sensing the locations of two bench mark locations.

The energy beams preferably are laser beams projected at constant angular velocities in parallel planes. The reference signal means is a radio transmitter that broadcasts the reference signal once during each revolution of the opposite laser beam. Also preferably, the portable sensing station includes elevation measuring means for determining the ground elevation of the location of the energy beam receiver according to the height at which the energy beam receiver detects one of the energy beams, which is denoted as a datum energy beam. In the special case where the energy beam is projected in a horizontal datum plane, the elevation of the location is equal to the elevation of the datum energy beam minus the height at which the datum energy beam strikes the energy beam receiver. If the datum energy beam is tilted so that the datum plane is not horizontal, a correction to the measured elevation can be made based on the measured position of the energy beam receiver in the datum planes.

Another aspect of the position sensing system of the present invention is the reference station itself, which is designed for use with another like reference station and a portable sensing station for surveying, marking, or other position sensing operations. During operation, two or more reference stations are spaced apart at known positions and the portable sensing station is sequentially positioned at one or more locations at which the positions are to be sensed. The reference station includes an energy beam transmitter, an energy beam detector, and reference signal means, preferably all mounted in a housing that supports the reference station in an upright orientation. The energy beam transmitter is operable for projecting an energy beam that sweeps in a plane and periodically strikes both the other reference station and the portable sensing station. The energy beam detector is operable for detecting the energy beam from the other reference station and triggering the reference signal means, which, in response, generates a reference signal for use by the portable sensing station. Preferably, the energy beams are laser beams, each of which is projected at a constant angular velocity in a horizontal plane. Also preferably, the reference signal means is a radio transmitter broadcasting the reference signal once during each revolution of the opposite laser beam.

Another aspect of the present invention is a portable sensing station, which is used with two or more stationary reference stations for surveying, marking, or other position sensing operations. The portable sensing station includes an energy beam receiver, a reference signal receiver, and processing means, of which at least the energy beam receiver is positioned at the location at which the position is to be sensed. The energy beam receiver is operable for detecting the energy beams projected by the reference stations, while the reference signal receiver is operable for receiving the reference signals generated by the reference stations. The processing means is functionally coupled to the energy beam and reference signal receivers and is responsive to the timing of the detection of the energy beams by the energy beam receiver relative to the receipt of the respective reference signals by the reference signal receiver for determining the position of the energy beam receiver relative to the reference stations in the plane of rotation of the energy beams. Preferably, the processing means includes a programmed portable computer that is transported with the energy beam and reference signal receivers. Also preferably, the portable sensing station includes elevation measuring means for determining ground elevation according to the height at which the energy beam receiver detects one of the energy beams.

Another aspect of the position sensing system of the present invention is an apparatus and method for surveying one or more locations. The surveying apparatus is similar to the position sensing apparatus summarized above, but further includes means for recording the planar positions relative to the energy beam transmitters and elevations relative to a datum energy beam of the locations to be surveyed. The method for surveying is similar to the position sensing method summarized above, but further includes the step of recording the positions and elevations of the locations surveyed.

A further aspect of the position sensing system of the present invention is an apparatus and method for positioning markers at one or more locations to be marked. The marking apparatus is similar to the position sensing apparatus summarized above, but further includes data base means coupled to the processing means for defining the planar positions relative to the energy beam transmitters of the locations to be marked, and position error means coupled to the processing means for indicating a positional error of the energy beam receiver relative to a location to be marked, wherein the position of the energy beam receiver defines the location to be marked when the positional error is substantially equal to zero.

The method for positioning markers includes the capability of finding at each location to be marked the difference in elevation between a desired elevation and a measured elevation thereof, where the desired elevations are calculated by interpolating between two nearby, elevation-defining line segments. The method is similar to the position sensing method summarized above, but further includes the steps of: selecting a plurality of elevation-defining line segments along each of which the contour of the land is assumed straight, i.e., having a constant slope, where each line segment extends between two end points at each of which the planar position and desired elevation is known; defining the planar positions relative to the transmitters of the locations to be marked; positioning the energy beam receiver near a location to be marked; indicating a positional error of the energy beam receiver relative to the location to be marked; repositioning the energy beam receiver until the positional error is substantially equal to zero; marking the position of the energy beam receiver when the positional error is substantially equal to zero; measuring the elevation of the location to be marked according to the height at which the energy beam receiver detects the datum energy beam when the positional error is substantially equal to zero; determining the desired elevation of the location to be marked according to the steps of finding two elevation-defining line segments that are closest in position to and surround the location to be marked, finding the elevations of two points on the line segments, wherein the two points define a line extending through the location to be marked and wherein the elevation of a point located on a line segment is found by interpolating between the elevations of the two end points of that line segment, and interpolating between the elevations of said two points to determine the desired elevation of the location to be marked; and determining the difference between the desired and measured elevations at the location to be marked as an elevation error.

Preferably, the data base means of the marking apparatus is incorporated with the processing means into a programmed portable computer that is transported with the energy beam and reference signal receivers. The programmed computer is preferably also used to determine the positional error of the energy beam receiver relative to the location to be marked. Also preferably, the calculations involved in determining the desired elevations and elevation errors of the locations to be marked are accomplished by the computer.

A still further aspect of the position sensing system of the present invention is an apparatus and method for sensing the position and elevation of a grading implement mounted on an earth-moving vehicle and for determining an elevation error of the grading implement relative to a desired elevation, wherein the desired elevation of the grading implement at a particular position is the elevation that would allow the earth-moving vehicle and attached grading implement to produce a desired graded surface at that position. In addition to the position sensing apparatus summarized above, the implement sensing apparatus includes data base means for defining the desired elevation of the grading implement as a function of the position of the earth-moving vehicle and grading implement, and includes computational means for determining the elevation error of the grading implement according to the difference between the measured and desired elevations thereof. The energy beam receiver is coupled to the grading implement, while the reference signal receiver is coupled to either the grading implement or the earth-moving vehicle. In addition to determining the position f the earth-moving vehicle relative to the energy beam transmitters, the processing means is also responsive to the height at which one of the energy beams strikes the energy beam receiver for determining the elevation of the grading implement and for determining the elevation error of the grading implement. The implement sensing apparatus may additionally include means for sensing the lateral position of the grading implement and for determining a lateral positioning error of the grading implement relative to a desired lateral position.

In addition to the steps comprising the position sensing method summarized above, the method for implement sensing further includes the steps of defining the desired elevations of the grading implement as a function of position of the grading implement throughout an area to be graded, determining the position of the grading implement relative to the transmitters according to the timing of the detection of the energy beams relative to the reception of the reference signals, where the energy beam receiver is coupled to the grading implement and the reference signal receiver is coupled to the earth-moving vehicle, measuring the elevation of the grading implement according to the height at which one of the energy beams strikes the energy beam receiver, and determining the elevation error of the grading implement from the difference between the measured elevation and the desired elevation thereof.

Still another aspect of the position sensing system of the present invention is a control system and method for controlling the grading implement of an earth-moving vehicle during the grading of a plot of land to a desired contour. The control system includes: first and second reference stations as summarized above and spaced apart at known positions, a receiver including an energy beam receiver coupled to the grading implement and a reference signal receiver mounted on the earth-moving vehicle, position measuring means operatively coupled to the receiver and operable for determining the position of the grading implement relative to the reference stations and for determining the elevation of the grading implement relative to a datum plane, data base means for defining the desired contour of the plot of land in terms of desired elevations of the grading implement relative to the datum plane as a function of the positions of the grading implement relative to the reference stations, processing means responsive to the measured position and elevation of the grading implement and responsive to the desired elevation of the grading implement for determining an elevation error of the grading implement according to the difference between the measured and desired elevations of the grading implement, and automatic control means responsive to the elevation error for automatically adjusting the elevation of the grading implement to reduce the elevation error. The implement control apparatus may additionally include means for sensing the lateral position of the grading implement, for determining a lateral positioning error of the grading implement relative to a desired lateral position, and means for controlling the lateral position of the grading implement by laterally shifting the grading implement relative to the earth-moving vehicle and/or by steering the earth-moving vehicle.

The method for controlling the grading implement is similar to the above-summarized method for implement sensing with the additional step of automatically adjusting the elevation of the grading implement to reduce the elevation error. This method may further include the step of automatically adjusting the lateral position of the grading implement to reduce the lateral positioning error.

The many features of the various aspects of the position sensing system of the present invention provide many advantages over conventional apparatus and methods of surveying, marking, and implement sensing and control. One feature of the present invention is its adaptability to several tasks, namely surveying, marking, and implement sensing and control. Another feature is that the comprehensive data base created during the surveying process can be reused throughout the subsequent processes of marking and implement sensing and control. Another feature is that the tasks of data gathering and processing can be accomplished efficiently and accurately by the programmed computer, instead of laboriously by a skilled surveyor. Still another feature of the present invention is that all three positional coordinates of a location can be determined in one operation. A further feature of the present invention is that the position-defining data is available at the portable sensing station, so that the data can be utilized immediately at the portable sensing station for operations such as marking and implement sensing and control. A still further feature is that multiple portable sensing stations can be utilized with the two reference stations in order to reduce the time required to accomplish a position sensing task. Another feature is that more than two reference stations can be utilized for increased accuracy and coverage. A further feature is that the location of the transmitters need not be known beforehand and can be determined through the use of the position sensing apparatus by a calibration procedure using as few as two bench mark locations.

As a surveying or marking apparatus and method, the present invention provides significant advantages over conventional surveying apparatus and methods. By utilizing the surveying or marking apparatus of the present invention, the process of surveying or marking can be accomplished by a single operator manning the portable sensing station, instead of two or more operators, as required by conventional methods. Also, that single operator need not be highly skilled, due to the fact that the computer of the present invention handles all of the necessary data processing. As noted above, several operators, each with their own portable sensing station, can work simultaneously to significantly reduce the time required to survey or mark a tract of land. Another way to speed up the surveying or marking process utilizing the present invention would be to mount the portable sensing station on a vehicle that can be speedily driven from location to location. Sites can be resurveyed during or after grading in order to verify the accuracy of grading by conventional methods. Sites can also be resurveyed after physical structures such as curbs or foundations have been erected to allow the site plan to be adapted to the as-constructed state of the site.

As a grading implement sensing or control apparatus and method, the present invention provides significant advantages over conventional apparatus and methods. Since the positions of the grading equipment is continuously sensed, the conventional intermediate step of marking the site with stakes can be eliminated. As with the surveying or marking processes, the grading process can also be accelerated using multiple portable sensing stations, each independently sensing and/or controlling the grading implement of an earth-moving vehicle. Any resurveying or checking of the graded surface can be accomplished easily using the same reference stations that have been set up for implement sensing and control. By automatically supplying grade control data to the graders, rather than grading to stakes or auxiliary grading references, time is saved and errors are avoided. In contrast to prior art apparatus for controlling implement elevation with respect to a laser datum plane, in which the implement elevation is limited to a fixed, predetermined distance below the laser datum plane, the present invention allows the use of variable elevations and slopes of the implement. In short, the present invention significantly streamlines the task of transforming a tract of land into the graded surface defined by the site plan.

The features and advantages described in the specification are not all inclusive, and particularly, many additional features and advantages will be apparent to one of ordinary skill in the art in view of the drawings, specification and claims hereof. Accordingly, resort to the claims is necessary to determine the scope of such inventive subject matter.

Moreover, it should be noted that the language used in the specification has been principally selected for readability and instructional purposes, and may not have been selected to delineate or circumscribe the inventive subject matter, which applies to a broad range of position sensing tasks. While certain embodiments of the present invention are shown as being used in conjunction with an earth-moving vehicle, it should be understood that the present invention may also be used on other grading implement or tool carrying vehicles such as bulldozers, trenching machines, curb-laying machines, and the like. The term "earth-moving vehicle" is intended to cover all such alternative vehicles or apparatus in conjunction with which it would be apparent to one skilled in the art to use the present invention. Likewise, the term "grading implement" is intended to cover all grading blades, tools, and other apparatus in conjunction with which it would be apparent to one skilled in the art to use the present invention. Likewise, the term "grading" is intended to cover all grading, earth-moving, ditch digging, pipe laying, curb constructing, and other like processes in conjunction with which it would be apparent to one skilled in the art to use the present invention. The terms "position" and "planar position" are used herein as referring to a location, position, or locality defined in terms of a planar position with respect to a known, or bench mark, position, while the term "elevation" is meant to refer to the elevation of the location, position, or locality measured orthogonally with respect to a reference plane. Typically, although not necessarily, the reference plane is horizontal and the planar position is denoted in terms of X,Y or R,Θ coordinates and the elevation is denoted in terms of a Z coordinate.

BRIEF DESCRIPTION OF THE DRAWINGS

FIG. 6 is a perspective view of a portable sensing station of the position sensing apparatus of FIG. 1.

FIG. 7 is a perspective detail view of a laser beam sensor portion of the portable sensing station of FIG. 6.

FIG. 8 is a block diagram of a datum indicator circuit of the portable sensing station of FIG. 6.

FIG. 9 is a schematic diagram of a timer circuit of the portable sensing station of FIG. 6.

FIG. 10 is a flow chart of a programmed computer portion of the portable sensing station of FIG. 6.

FIG. 17 is a top plan view of an earth-moving vehicle employing the present invention to follow a desired lateral contour.

FIG. 18 is a perspective view of an earth-moving vehicle with two laser receiver masts installed thereupon.

FIG. 19 is a plan view diagram illustrating the process of position and orientation sensing of the earth-moving vehicle of FIG. 18.

FIG. 20 is a perspective view of an earth-moving vehicle with a single receiver mast installed thereupon.

DETAILED DESCRIPTION OF THE PREFERRED EMBODIMENT

Figure 1:
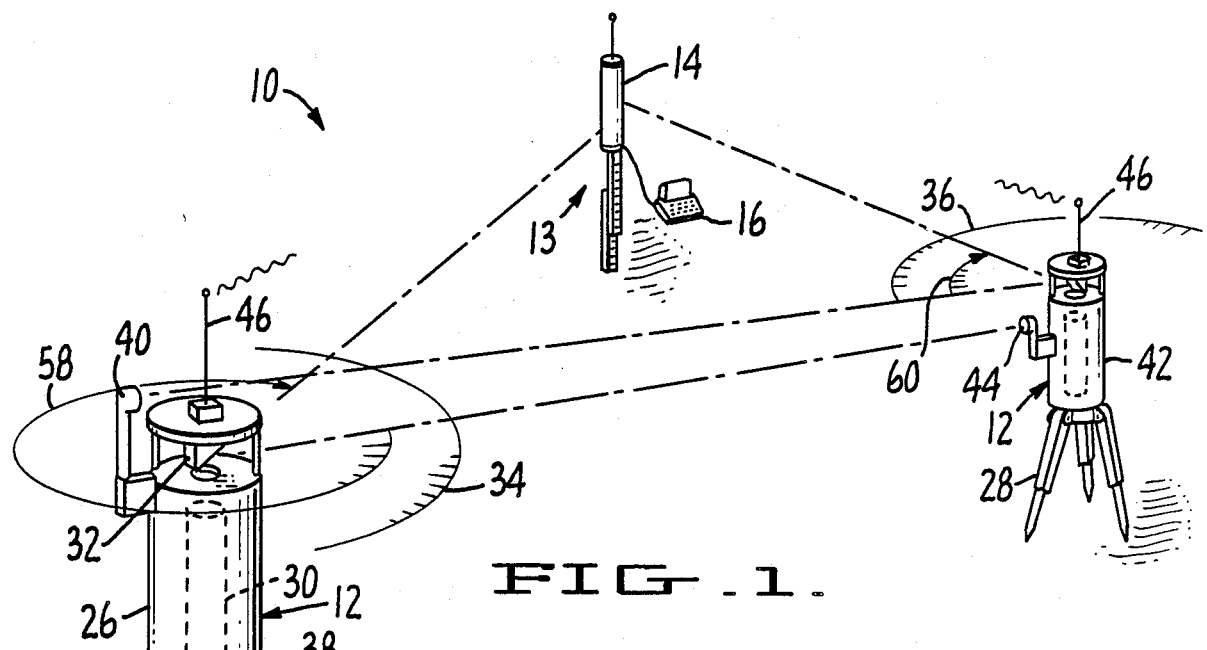
FIG. 1 is a perspective view of a position sensing apparatus according to the present invention.
Figure 2:
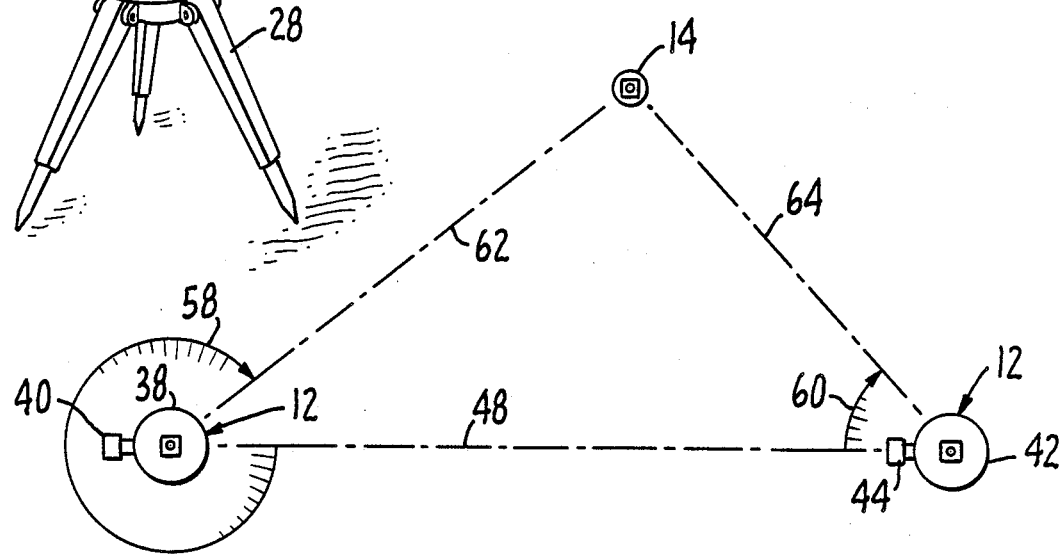
FIG. 2 is a top plan view of the position sensing apparatus of FIG. 1.

FIGS. 1 through 28 of the drawings depict various preferred embodiments of the present invention for purposes of illustration only. One skilled in the art will readily recognize from the following discussion that alternative embodiments of the structures and methods illustrated herein may be employed without departing from the principles of the invention described herein.

The preferred embodiment of the present invention is a three-dimensional position sensing apparatus and method utilizing laser reference stations and one or more portable position sensors. The position sensing apparatus and method of the present invention will first be described in relation to the tasks of surveying and marking, and will later be described in relation to the tasks of grading implement sensing and controlling.

As shown in FIGS. 1, 2, 3, and 4, a position sensing apparatus 10 according to the present invention preferably includes two reference stations 12 and a portable sensing station 13. The portable sensing station 13 in turn comprises a receiver 14 and a portable computer 16. The two reference stations 12 are positioned apart at stationary locations adjacent to an area to be surveyed or marked, while the portable sensing station 13 is sequentially positioned at various locations throughout the area to be surveyed or marked. The positions of the reference stations 12 are known either by placing the reference stations at known locations relative to some origin or reference coordinate system, or by placing the reference stations at unknown locations and subsequently determining the positions of the reference stations by a calibration procedure, which will be described below in further detail.

As will be apparent from the following description, the position sensing apparatus 10 is operable for determining the planar position of the receiver 14 with respect to the planar positions of the two reference stations 12, and is also operable for determining the elevation at the receiver with respect to the elevation of one of the reference stations. The planar position of the receiver 14 is preferably determined in a datum plane, preferably but not necessarily horizontal, while the elevation at the receiver is preferably measured vertically.

Figure 4:
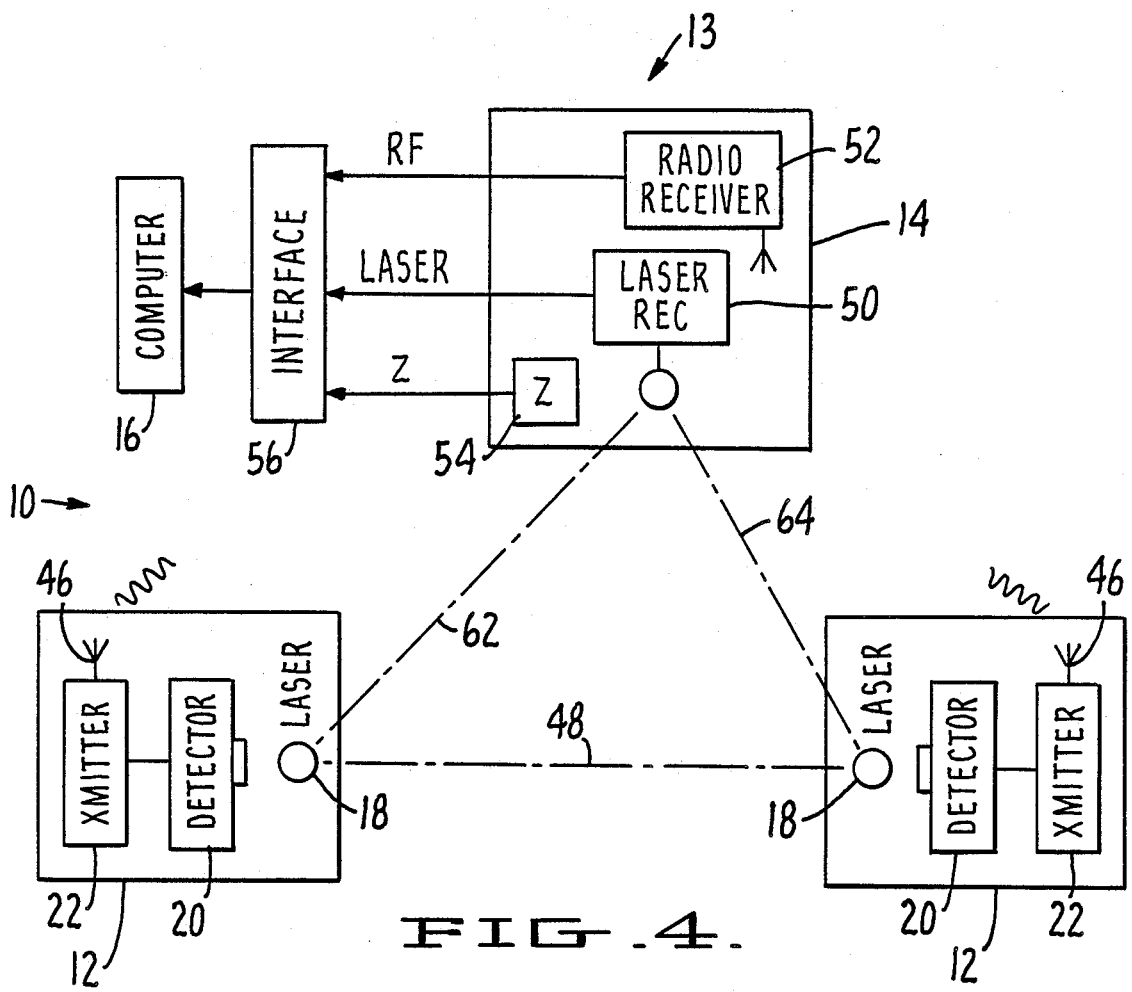
FIG. 4 is a block diagram of the position sensing apparatus of FIG. 1, illustrating two reference stations and a portable sensing station.
Figure 5:
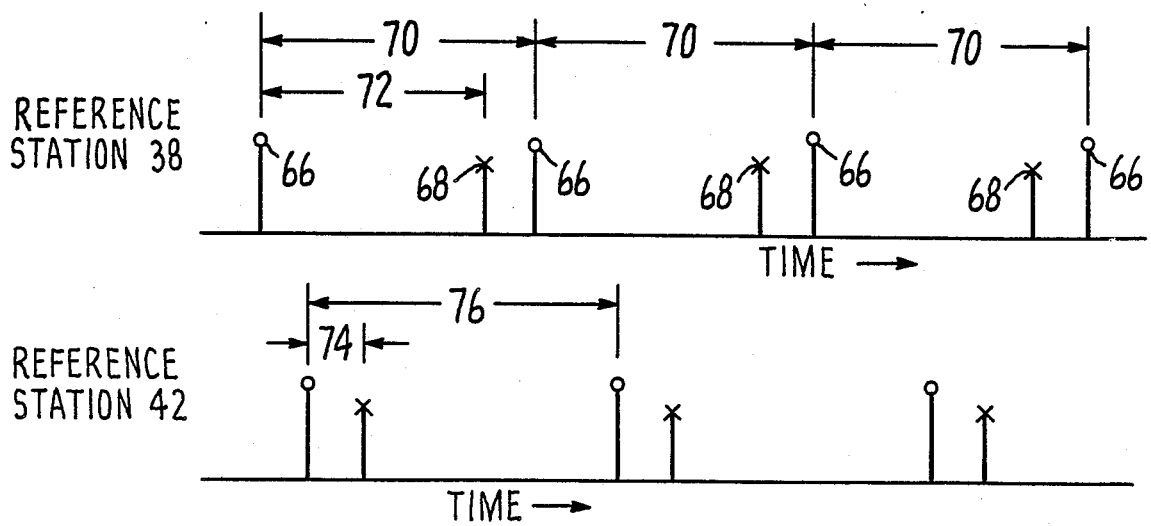
FIG. 5 is a timing diagram of various signals processed by the position sensing apparatus of FIG. 1.

Each of the reference stations 12 preferably includes a laser transmitter 18, a laser detector 20, and a radio signal transmitter 22 that is coupled to the laser detector 20, as shown in FIG. 4. Each laser transmitter 18 projects an energy beam that sweeps across the area to be surveyed or marked. The laser transmitter 18 projects a laser beam that rotates in a plane at a constant angular velocity. Once each revolution, the laser beam strikes both the receiver 14 and the laser detector 20 mounted on the other reference station 12.

Figure 3:
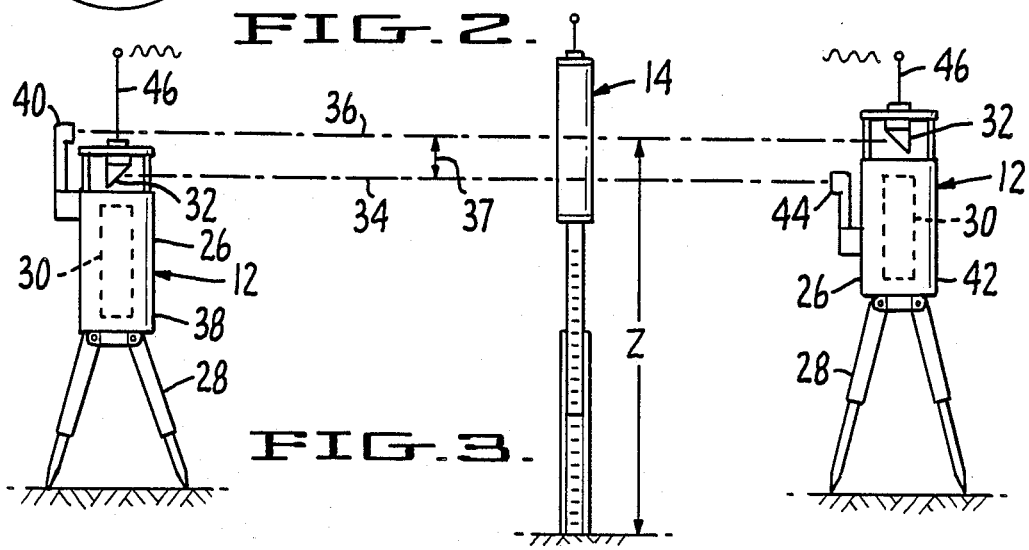
FIG. 3 is a side elevation view of the position sensing apparatus of FIG. 1.

Each reference station 12 includes a housing 26 that is supported in an upright orientation by a tripod 28, shown in FIGS. 1 and 3. Within the housing 26 is a laser source 30 that projects a laser beam vertically upward to a rotating or oscillating lens 32, which reflects the laser beam into a horizontal planar path. The rotational or oscillatory period of the projected laser beam is preferably about one tenth of a second, which is equivalent to a frequency of about ten revolutions or oscillations per second. The reference station 12 need not project the laser beam over a complete circle; an arc that covers the area to be surveyed or marked plus the other reference station is sufficient. The need to limit off-site transmission of the laser beams may dictate the use of shutters to restrict the projection of the laser beam in certain directions. It is preferable that the laser beam be projected in a horizontal plane, however, inclined planes may also be utilized within the scope of the present invention. Since in some applications, such as surveying and marking, it is preferable for the laser beams to rotate in a horizontal plane, much of the following description will refer to the laser plane as horizontal. Such references are not to be taken as limitations, since the position sensing apparatus and methods can operate with non-horizontal laser planes.

Laser transmitters similar to the laser transmitters 18 are known in the art, one example of which is disclosed in U.S. Pat. No. 3,588,249 issued to R. H. Studebaker, and other examples of which are available as a commercial product from Spectra Physics of Dayton, Ohio as laser models 945 and 1045.

Preferably, the two reference stations 12 are erected so that the horizontal planes 34 and 36 formed by the two projected laser beams are spaced apart by a separation distance 37, as shown in FIG. 3. Each of the two laser detectors are mounted on their respective reference stations 12 at the vertical position defined by the laser plane 34 and 36 projected by the opposite reference station. In the case of reference station 38, shown at the left of FIGS. 1-4, a laser detector 40 is positioned above the laser plane 34 projected from that reference station by a distance equal to the separation distance 37. In the case of reference station 42, shown at the right of FIGS. 1-4, a laser detector 44 is positioned below the laser plane 36 projected from that reference station by a distance equal to the separation distance 37. Each laser detector 20 triggers its associated radio signal transmitter 22 to broadcast a radio signal each time the laser beam from the opposite reference station 12 strikes the laser detector 20. An antenna 46 located at the top of each reference station 12 is connected to the radio transmitter 22 to facilitate the broadcast of the radio signal. Preferably, the two radio signals are broadcast at different frequencies or are otherwise encoded so that the receiver 14 can distinguish between them. The line extending between the two reference stations 12 defines a reference line 48 that will be used to determine the relative positions of the receiver 14.

As shown in FIG. 4, the receiver 14 includes a laser receiver 50, a radio signal receiver 52, and means 54 for measuring the elevation (Z) of the location to be surveyed or marked. The laser receiver 50 is preferably a photocell or other sensor that is responsive to impinging energy from the two incident laser beams, while the radio signal receiver 52 is responsive to the radio signals broadcast by the two radio signal transmitters 22. The laser receiver 50, the radio signal receiver 52, and the elevation measuring means 54 are electrically coupled through an interface circuit 56 to the portable computer 16.

The computer 16 is programmed in such a way, as described below, to enable it to calculate the position of the receiver 14 in the plane of the laser beams with respect to the positions of the reference stations 12 and the reference line 48 according to the relative timing of reception of the laser and radio signals by the laser and radio signal receivers 50 and 52. Given that each laser beam rotates at a constant angular velocity, and that a radio signal is broadcast each time the laser beam is aligned with the reference line 48, the angle 58 or 60 (FIG. 2) between the reference line 48 and a line 62 or 64 between a reference station 40 or 42 and the receiver 14 is proportional to the ratio of the time interval between the reception of the radio signal and the reception of the laser beam at the receiver to the time interval of the period of rotation of the laser beam.

The radio receiver 52 of the receiver 14 periodically receives the radio signal that is broadcast each time the laser beam from reference station 38 hits the detector 44 on reference station 42, which occurs each time the laser beam is aligned with the reference line 48. Each such reception of the radio signal is denoted at points 66 on the time line in FIG. 5. The laser receiver 50 of the receiver 14 periodically detects the laser beam projected from reference station 38, as denoted by points 68 on the time line. The time interval 70 between successive points 66 is equal to the period of rotation of the laser beam projected by reference station 38, while the time interval 72 between a point 66 and a subsequent point 68 is the time required for the laser beam to swing around from the reference line 48 to line 62. Thus, the ratio of time interval 72 to time interval 70 multiplied by $2\pi$ is equal to the angle 58 in radians, or, the ratio multiplied by 360° is equal to the angle 58 in degrees. Likewise, the angle 60 between reference line 48 and line 64 with reference station 42 at the vertex thereof is determined from the ratio of time interval 74 to time interval 76. Time interval 74 is equal to the time interval between the reception by the radio signal receiver 52 of the radio signal broadcast when the laser beam projected from reference station 42 hits detector 40 and the reception by the laser receiver 50 of the laser beam from reference station 42, which occurs each time the laser beam is aligned with the reference line 48. Time interval 76 is equal to the period of rotation of the laser beam. Note that the time intervals 70 and 76, which are equal to the periods of rotation of the two laser beams, could alternatively be determined between successive receptions of the laser beams by the receiver 14 rather than successive receptions of the radio signals. The foregoing assumes that both laser beams rotate in the clockwise direction at constant angular velocity and that the two angles 58 and 60 are measured clockwise from the reference line 48. As described below, the computer 16 does the necessary calculations to compute the angles and records the results.

The portable sensing station 13 is also operable for determining the elevation at the position of the receiver 14 with respect to one of the laser planes. If laser plane 36 is denoted as a datum or reference plane, as shown in FIG. 3, then the elevation, Z, of the ground at the foot or base of the receiver 14 with respect to the laser plane 36 can be determined from the height at which the laser plane 36 intersects the laser receiver 50. One type of receiver design is shown in FIG. 6 to include an extensible rod 80, an extension measuring device 82, a laser receiver 50, a radio receiver 52, and a receiving antenna 84. The extensible rod 80 serves to support the laser receiver 50 at the proper elevation for intercepting the laser beams. The extension measuring device 82, which can be as simple as a tape measure, provides means for determining the height at which the datum laser beam intersects the laser receiver according to the extension of the extensible rod 80. The radio receiver 52 and its coupled receiving antenna 84 are positioned atop the laser receiver 50, for purposes described above. The laser and radio receivers 50 and 52, and, optionally, the extension measuring device 82, are coupled to the portable computer via a cable 86.

In order to determine the elevation at the location to be surveyed or marked, an operator orients the receiver 14 vertically and adjusts the extensible rod 80 until the datum laser beam strikes the receiver 14 at a predetermined position, at which point the extension of the extensible rod is determined by the extension measuring device 82 and is entered into and recorded by the computer 16. The elevation Z is, thus, equal to the height above ground at which the datum laser beam intersects the receiver 14.

In the laser receiver 50 shown in FIG. 7, the predetermined position at which the datum laser beam must strike for elevation measurements is at the center 88 of a vertical array of photodetectors 90. The photodetectors 90 are arranged in vertical rows on the four sides of a support structure 92 within a transparent casing 94. Each level of photodetectors 90 contains four photodetectors that are connected in common to a circuit shown in block form in FIG. 8. The four photodetectors 90 on each level may be connected in common because the laser receiver 50 needs to detect the heights and times at which the laser beams strike, but not the orientations. The photodetectors located above the center level of photodetectors 88 are coupled to a first detector circuit 96, while the photodetectors located below the center level of photodetectors are coupled to a second detector circuit 98. The center level of photodetectors 88 is coupled to a third detector circuit 100.

The three detector circuits 96, 98, and 100 illuminate one of three indicators 102, 104, or 106, respectively, depending upon which photodetector 90 receives the datum laser beam. The indicators 102-106 are used to communicate with the operator during elevation measurements. If the datum laser beam strikes any of the photodetectors located above the center level 88, then the receiver is positioned too low, in which case detector circuit 96 illuminates indicator 102 to inform the operator to raise the laser receiver 50 by extending the extensible rod 80. The photodetectors located above the center level may be subdivided into two groups, a low-fine group 108 located close to the center level and a low-coarse group 110 located toward the upper end of the array of photodetectors. Such a grouping can be utilized advantageously to inform the operator as to which group, fine or coarse, is receiving the datum laser beam, so as to inform the operator how much to adjust the height of the rod 80. The indicator 102 preferably glows continuously when the low-coarse group 110 is struck by the datum laser beam and glows intermittently when the low-fine group 108 is struck.

Similarly, if the datum laser beam strikes any of the photodetectors located below the center level 88, then the receiver is positioned too high, in which case detector circuit 98 illuminates indicator 104 to inform the operator to lower the laser receiver 50 by retracting the extensible rod 80. The photodetectors located below the center level may be subdivided into two groups, a high-fine group 112 located close to the center level and a high-coarse group 114 located toward the lower end of the array of photodetectors. The indicator 104 preferably glows continuously when the high-coarse group 114 is struck by the datum laser beam and glows intermittently when the high-fine group 112 is struck.

Once the height of the receiver 14 has been correctly adjusted, the datum laser beam will strike the center level of photodetectors 88, which triggers the detector circuit 100 to illuminate the "on datum" indicator 106. At this point, the height of the receiver is determined in order to calculate the elevation at that location of the receiver.

Since two, spaced-apart laser beams are received by the laser receiver 50, means must be provided to distinguish between the two laser beams so that only the datum laser beam will trigger the on-datum indicator 106. Such means can recognize the datum laser beam as the higher or lower of the two laser beams, as the case may be.

The above-described receiver 14 is just one of many ways of implementing an elevation detector responsive to a laser datum plane. Another implementation will be described below in reference to FIG. 19. Other elevation detectors can be found in the prior art, including those disclosed in U.S. Pat. Nos. 3,469,919, 3,894,230, and 4,030,832.

The above description of elevation measurement assumes that the datum plane is horizontal. If the datum plane is inclined, the height measured at the receiver must be corrected for the tilt of the datum plane in order to obtain a true elevation measurement. This correction is simply a function of the measured planar position of the receiver.

A timing circuit 116, shown in FIG. 9 and contained in the interface circuit 56, is used to measure the time intervals needed to compute the position of the receiver 14. The timing circuit 116 is seen to include three timers 118, 120, and 122. The portable sensing station 13 includes two such timing circuits 116, one coupled to one channel of the laser and radio receivers 50 and 52, and the other coupled to the other channel of the laser and radio receivers. Each timing circuit 116 supplies to the computer 16 a value equal to a pair of time intervals, 70 and 72, or 74 and 76.

Interval timer 118 is used to determine the time interval between the receipt of a radio signal and the detection of the corresponding laser beam, namely time intervals 72 and 74, while period timers 120 and 122 function alternately to determine the period of rotation of the laser beam, namely time intervals 70 and 76. A signal from the radio receiver 52, a radio signal detect signal, is supplied to the start terminal of interval timer 118 and to the input port of a flip-flop 124. A signal from the laser receiver 50, a laser detect signal, is supplied to the stop terminal of timer 118, and is supplied through a delay line 130 to the reset terminal of timer 118. One output terminal of the flip-flop 124 is coupled to the start terminal of timer 120, the stop terminal of timer 122, and the input terminal of a delay line 126. The other output terminal of the flip-flop 124 is coupled to the stop terminal of timer 120, the start terminal of timer 122, and the input terminal of another delay line 128. The output terminal of delay line 126 is coupled to the reset terminal of timer 122, while the output terminal of delay line 128 is coupled to the reset terminal of timer 120. The data output terminals of all three timers are coupled to the computer 16.

In operation, timer 118 starts measuring a time interval, either 72 or 74 upon the receipt of the radio (reference) signal detect signal from the radio receiver 52. This signal also passes through the flip-flop 124 and starts one of the other timers 120 or 122, depending on the position of the flip-flop. Upon the subsequent receipt of the laser detect signal, timer 118 stops timing and the computer 116 reads the contents of the timer as a measure of time interval 72 or 74. Once the computer has had enough time to read the contents of the timer, the delay line 130 resets timer 118 to prepare for the next measurement interval. Upon the next receipt of the radio signal detect signal, the period timer 120 or 122 that had been timing stops, and the other period timer 120 or 122 that had been stopped starts, and the interval timer 118 also starts. Two period timers 120 and 122 are utilized to measure the rotational period of the laser in order to measure each period while allowing the computer to read the measured value. Once timer 120 stops and timer 122 starts, the computer reads the value of timer 120, and, shortly thereafter, the delay line 128 resets timer 120 so that it will be ready to time the next succeeding period.

As an alternative, the timing circuit 116 could include two interval timers, one of which measures the time interval between the receipt of a radio detect signal and the receipt of a laser detect signal, and the other of which measures the time interval between the receipt of the laser detect signal and the next succeeding radio detect signal.

Figure 11:
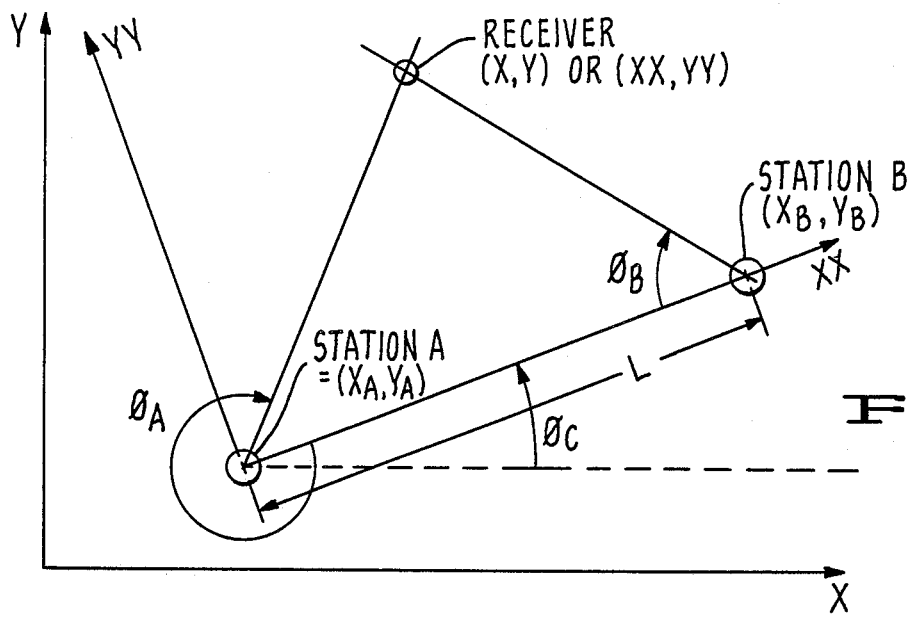
FIG. 11 is a plan view diagram showing placement of the position sensing apparatus of FIG. 1 relative to two Cartesian coordinate systems.

In reference now to FIGS. 10 and 11, the operation of the programmed computer 16 during computation of the position of the receiver 14 will now be described. The first two steps, which may be carried out serially or in parallel, involve the computation of the two angles 58 and 60 that define the position of the receiver. Angle 58, which is the angle measured clockwise from the reference line 48 to the line 62 between reference station 38 and the receiver 14, will be denoted as $\phi_A$, while angle 60, which is the angle measured clockwise from the reference line 48 to the line 64 between reference station 42 and the receiver 14, will be denoted as $\phi_B$. To compute angle $\phi_A$, the computer reads the value of the interval timer 118 of channel A, reads the value of the period timer 120 or 122 of channel A, and divides the first value by the second value, where channel A is the timing circuit 116 that responds to the detection of the laser beam projected by reference station 38 and the reception of the radio signal triggered by laser detector 44. Similarly, to compute angle $\phi_B$, the computer reads the value of the interval timer 118 of channel B, reads the value of the period timer 120 or 122 of channel B, and divides the first value by the second value, where channel B is the timing circuit 116 that responds to the detection of the laser beam projected by reference station 42 and the reception of the radio signal triggered by laser detector 40.

The next step in the operation of the programmed computer is to determine the coordinate position of the receiver 14 in an XX-YY coordinate system, wherein the XX axis extends in a positive direction from reference station 38 (station A) through reference station 42 (station B) and the YY axis extends orthogonally to the XX axis beginning at reference station 38. The separation distance between the two reference stations 38 and 42 is denoted as L. The computer computes the XX,YY position of the receiver 14 according to the following equations:

$$XX = \frac{L \cdot \text{Tan}\phi_B}{\text{Tan}\phi_B - \text{Tan}\phi_A} = L \cdot G, \text{ where } G = \frac{\text{Tan}\phi_B}{\text{Tan}\phi_B - \text{Tan}\phi_A}$$

$$YY = \frac{L \cdot \text{Tan}\phi_A \cdot \text{Tan}\phi_B}{\text{Tan}\phi_B - \text{Tan}\phi_A} = L \cdot H,$$

$$\text{where } H = \frac{\text{Tan}\phi_A \cdot \text{Tan}\phi_B}{\text{Tan}\phi_B - \text{Tan}\phi_A}$$

In the next step, which may be eliminated if the position data is to be expressed only in terms of XX-YY coordinates, the programmed computer transforms the XX,YY coordinates into an X,Y coordinate system, which may be a more useful way of expressing the position-defining data. The XX axis is rotated an angle of $\phi_C$ with respect to the X axis. The coordinate location of reference station 38 is $(X_A, Y_A)$, while the coordinate location of reference station 42 is $(X_B, Y_B)$. The computer computes the X,Y position of the receiver 14 according to the following equations:

$$\begin{aligned}
X &= X_A + L \cdot G \cdot \text{Cos}\phi_C - L \cdot H \cdot \text{Sin}\phi_C \\
&= X_A + G(X_B - X_A) - H(Y_B - Y_A) \\
Y &= Y_A + L \cdot G \cdot \text{Sin}\phi_C + L \cdot H \cdot \text{Cos}\phi_C \\
&= Y_A + G(Y_B - Y_A) + H(X_B - X_A)
\end{aligned}$$

In the final step, the programmed computer stores the X,Y and/or XX,YY coordinates as computed above, and also stores the measured elevation or Z value for that location of the receiver 14. At this point, the measured position and elevation can be corrected for any inclination of the datum plane. The operator then places the receiver 14 at another location to be surveyed or marked and reinitiates the data gathering process described above.

The planar position of the receiver 14 can thus be computed in the XX,YY coordinate system by knowing $\phi_A$, $\phi_B$, and L. The planar position of the receiver 14 can be transformed into another coordinate system by knowing the coordinates of one reference station and the angle $\phi_C$, or the coordinates of both reference stations. Although not specifically discussed, the above calculation can alternatively be carried out in or transformed into an R,Θ,Z coordinate system.

Figure 12:
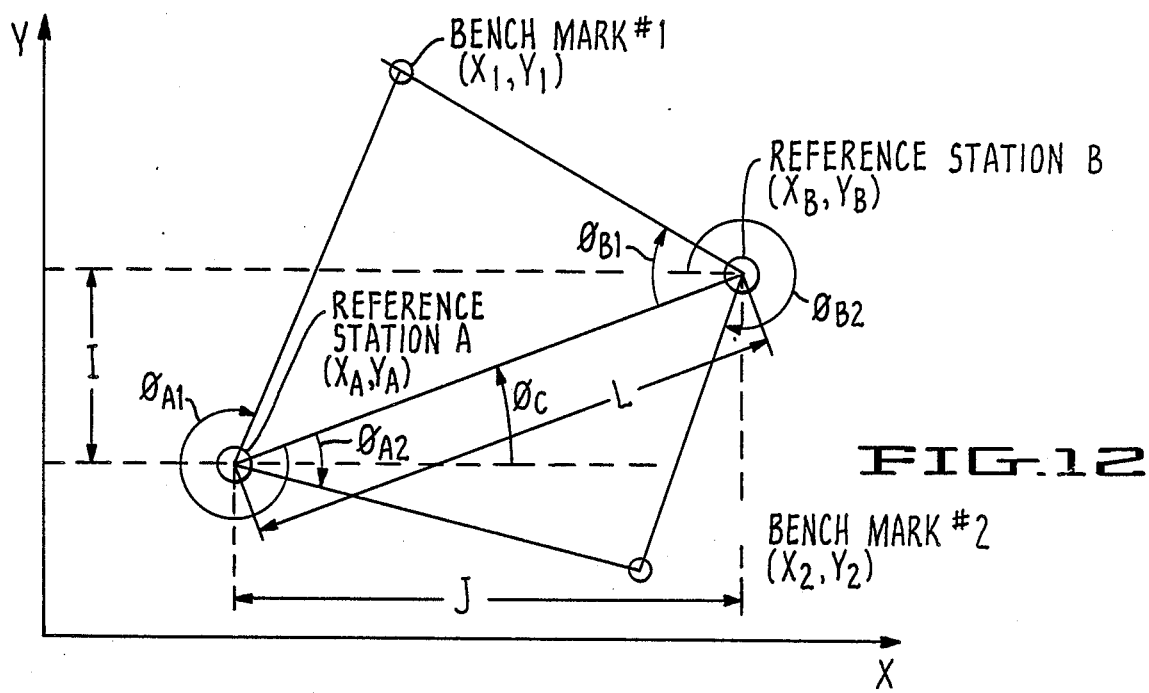
FIG. 12 is a plan view diagram illustrating a calibration of the position sensing apparatus of FIG. 1 to two bench mark locations.

When the reference stations 38 and 42 are initially set up, their positions may not be known. If not, the following calibration procedure may be utilized to determine the coordinates of the reference stations knowing the X,Y coordinates of two bench mark locations. As shown in FIG. 12, bench mark location #1 has the known coordinates of $(X_1, Y_1)$ in the X,Y coordinate system, and bench mark location #2 has the known coordinates of $(X_2, Y_2)$ in the X,Y coordinate system. The coordinates of the reference stations 38 and 42 in the X,Y coordinate system and the separation distance therebetween need not be known prior to calibration. The calibration procedure involves positioning the receiver 14 at each bench mark location and determining the angular position of each bench mark location with respect to the reference stations. The position of bench mark location #1 relative to the reference stations is given by $(\phi_{A1}, \phi_{B1})$, and the position of bench mark location #2 relative to the reference stations is given by $(\phi_{A2}, \phi_{B2})$, as shown in FIG. 12. Once the angular coordinate data has been obtained, the following equations can be utilized to compute the coordinates of the reference stations, the separation distance, and the angle $\phi_C$:

$$X_A = \tfrac{1}{2}[X_1 + X_2 - J(G_1 + G_2) + I(H_1 + H_2)]$$
$$X_B = X_A + J$$
$$Y_A = \tfrac{1}{2}[Y_1 + Y_2 - I(G_1 + G_2) - J(H_1 + H_2)]$$
$$Y_B = Y_A + I$$
$$L = (I^2 + J^2)^{\tfrac{1}{2}}$$
$$\phi_C = \text{Arctan } I/J$$
WHERE $$I = Y_B - Y_A = \frac{(G_1 - G_2)(Y_1 - Y_2) - (H_1 - H_2)(X_1 - X_2)}{(H_1 - H_2)^2 + (G_1 - G_2)^2}$$

$$J = X_B - X_A = \frac{(G_1 - G_2)(X_1 - X_2) + (H_1 - H_2)(Y_1 - Y_2)}{(H_1 - H_2)^2 + (G_1 - G_2)^2}$$

$$G_1 = \frac{\text{Tan}\phi_{B1}}{\text{Tan}\phi_{B1} - \text{Tan}\phi_{A1}} \quad G_2 = \frac{\text{Tan}\phi_{B2}}{\text{Tan}\phi_{B2} - \text{Tan}\phi_{A2}}$$

$$H_1 = \frac{\text{Tan}\phi_{A1} \cdot \text{Tan}\phi_{B1}}{\text{Tan}\phi_{A1} - \text{Tan}\phi_{B1}} \quad H_2 = \frac{\text{Tan}\phi_{A2} \cdot \text{Tan}\phi_{B2}}{\text{Tan}\phi_{A2} - \text{Tan}\phi_{B2}}$$

Since the tangent function is undefined at angles of 90° and 270°, the following equations apply when either $\phi_A$ or $\phi_B$ are equal to one of those values:
When $\phi_A = 90°$ or 270°, G=0, H=Tan $\phi_B$
$\phi_B = 90°$ or 270°, G=1, H=−Tan $\phi_A$ If the datum plane is inclined, then the inclination of the datum plane can be obtained by measuring the elevations of three bench marks and then finding the unique plane that passes through the three bench marks.

The position sensing accuracy of the present invention is a function of the location of the receiver 14 with respect to the reference stations 38 and 42. Along the reference line 48, the position of the receiver 14 can not be determined because both angles 58 and 60 would be equal to zero and the triangle formed by lines 48, 62, and 64 would collapse into a straight line. Even apart from the region along or near the reference line, the accuracy of position sensing utilizing the present invention is effected by factors such as divergence of the laser beams, uncertainty due to photodetector size, variations in the angular velocity of the laser transmitters, and tolerances for measuring time intervals and computing angles. Certain of these factors can be corrected for by the computer once a first order determination of position has been made.

Figure 13:
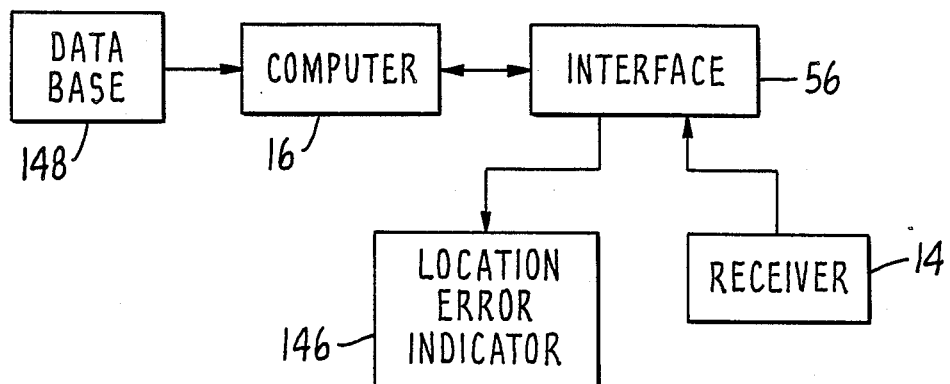
FIG. 13 is a block diagram of a processor utilized as part of the portable sensing station of the present invention when used for position marking.

In reference now to FIG. 13, there is shown an adaptation of the previously described portable sensing station 13 that enables the position sensing system of the present invention to be used for position locating for purposes such as marking. In addition to the receiver 14, interface 56, and computer 16, the portable sensing station 144 further includes a location error indicator 146 and a data base 148. The data base 148 is coupled to the computer 16 and contains information that defines the positional coordinates of the positions to be located. The location error indicator 146 is an output device that informs the operator of the direction and, preferably, also the magnitude of a positional error.

In operation, the operator instructs the computer 16 to retrieve the positional coordinates of a selected location from the data base 148. The operator then positions the receiver 14 at a trial location and instructs the computer 16 to determine the position of the receiver at that point. The computer then compares the measured position of the receiver, as determined by the procedure described above, with the desired position thereof, as specified by the positional coordinates of the selected location retrieved from the data base 148. The difference between the measured and desired positions is a positional error that is communicated to the operator through the location error indicator 146. The operator then adjusts the position of the receiver 14 until the positional error is substantially equal to zero. At that point, the receiver 14 is positioned at the selected location, and the operator can plant a stake or other marker if necessary. The elevation at this position can also be measured and compared to a desired elevation, and any difference between the measured and desired elevations can be noted. The desired elevation at the location to be marked can be obtained from a site plan and stored in the data base 148, or can be computed by interpolating between the desired elevations of two adjacent elevation-defining line segments, according to an interpolation method described below in conjunction with FIG. 23. Once the marking or measuring tasks have been completed at that location, the portable sensing station 144 can be used to find yet another location to be marked.

Now that the apparatus and methods relating to the use of the present invention in surveying and marking have been described, we turn to the use of the present invention in grading implement sensing and controlling. The major difference between the use of the position sensing system of the present invention for grading implement sensing and control and the previously described uses is that the portable receiver 13 of the position sensing apparatus 10 is mounted on an earth-moving vehicle or other grading equipment, and is used to assist the operator of the earth-moving vehicle in grading the tract of land to a desired contour. The desired contour is defined in terms of desired elevation (Z) of the graded tract with respect to planar position (X,Y).

Figure 14:
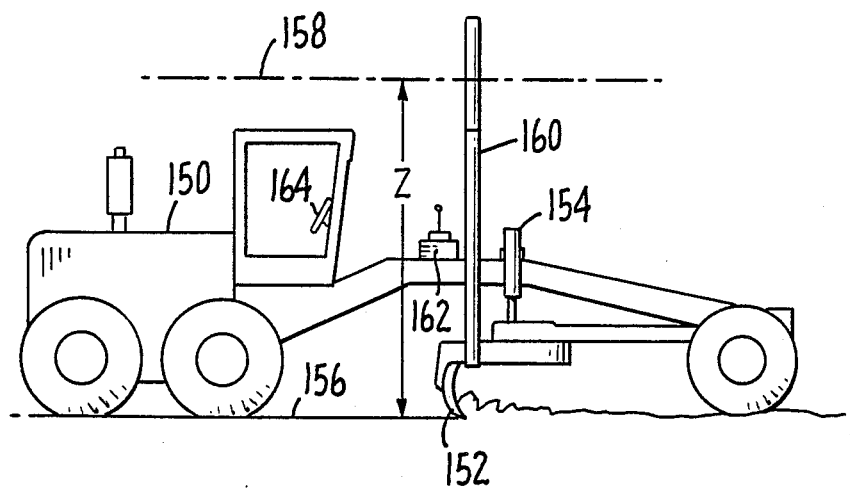
FIG. 14 is a side elevation view of a receiver mast of the present invention attached to an earthmoving vehicle for implement position sensing or control.
Figure 15:
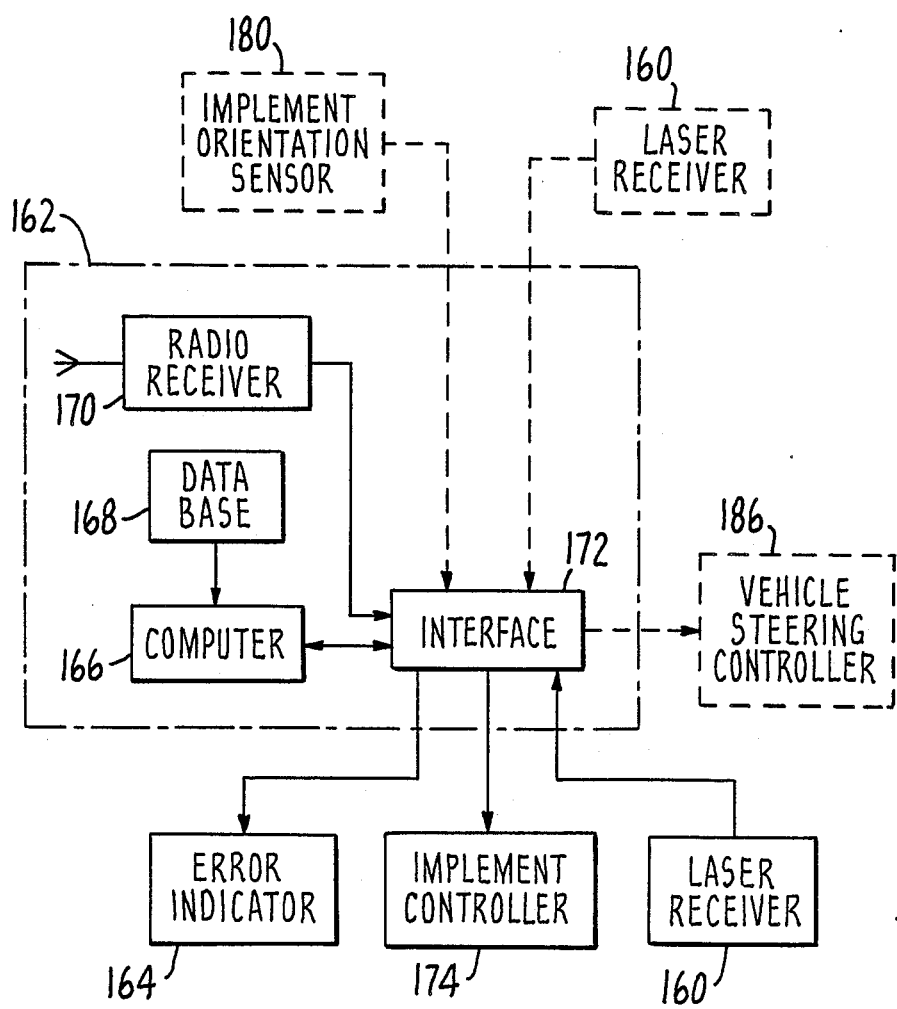
FIG. 15 is a block diagram of a processor utilized as part of the portable sensing station when used for implement position sensing or control.
Figure 16:
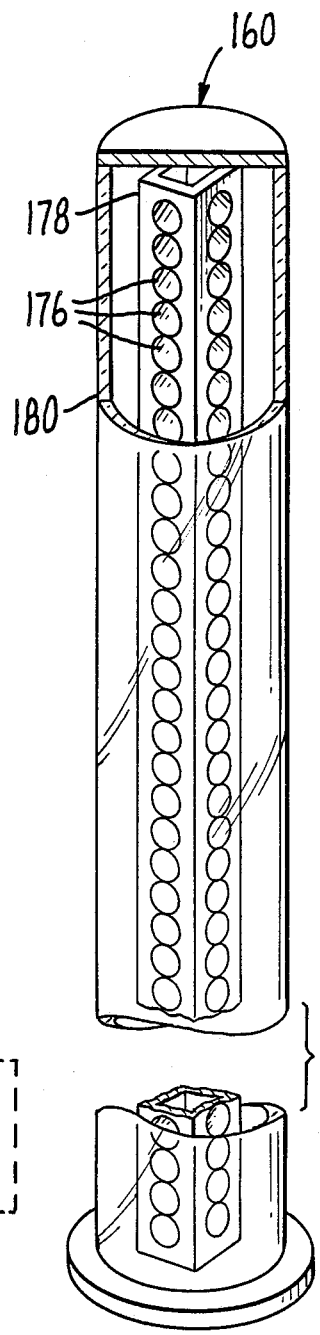
FIG. 16 is a perspective view, partially broken away, of a laser receiver mast.

As shown in FIG. 14, an earth-moving vehicle 150 is equipped with a blade or grading implement 152, the position of which with respect to the vehicle 150 can be varied by hydraulic cylinders 154 according to means well known in the art. The apparatus of the present invention, as applied to implement sensing and control, is utilized to measure the elevation (Z) of the graded surface 156 with respect to a datum laser plane 158. The implement sensing and control apparatus of the present invention is mounted to the earth-moving vehicle and includes a laser receiver mast 160, a remote processing unit 162, and an indicator 164. The laser receiver mast 160 is coupled to the grading implement 152 for movement therewith so that the mast elevation is directly related to the elevation of the grading implement. In other words, the mast 160 is raised and lowered as the grading implement 152 is raised and lowered. Means (not shown) may be utilized to keep the mast 160 in a vertical orientation regardless of the orientation of the vehicle or implement. As shown in FIG. 15, the remote processing unit 162 preferably contains a programmed computer 166 and coupled data base 168, and a radio signal receiver 170. The radio signal receiver 170, the laser receiver 160, and the indicator 164 are coupled to the computer 166 through an interface 172 in a manner similar to interface 56 described above. The indicator 164 is mounted in or near the cab of the earth-moving vehicle and is utilized to display to the operator of the earth-moving vehicle an indication of the elevation error of the grading implement as determined by the computer 166. When used to automatically control the height or elevation of the grading implement 152, the apparatus further includes an implement controller 174, which is coupled to the computer 166 through the interface 172, and which is capable of automatically adjusting the position of the grading implement in order to reduce the elevation error, as described below.

The laser receiver mast 160, like the laser receiver 50 of receiver 14 described above, is operable for detecting when each laser beam strikes the mast, and is also operable for detecting the height at which one of the laser beams, the datum laser beam, strikes the mast. Instead of providing an extensible support structure to elevate the laser receiver to the proper height, an alternative construction having a fixed height, illustrated in FIG. 17, is preferably employed for the laser receiver mast 160. The laser receiver mast 160 preferably includes an elongated linear array of photodetectors 176, extending vertically for a distance of several feet. The photodetectors 176 are arranged in four vertical rows of a support structure 178 within a transparent casing 180. Each level of photodetectors is preferably coupled in common to the interface circuit 172. The array of photodetectors is preferably disposed above the roof of the earth-moving vehicle so that the laser beams may be received at any orientation of the vehicle. The elevation measurement of the grading implement 152 is determined from the height at which the datum laser beam strikes the laser receiver mast 160, as detected by whichever of the photodetectors 176 the datum laser beam strikes. Unlike receiver 14, the height of the mast 160 is not adjusted for purposes of making the elevation measurement, thus speeding up the measurement process.

In operation as an implement sensing apparatus, the laser receiver 160, the radio receiver 170, the interface 172, and the programmed computer 166 operate as described above in sensing the position of the laser receiver in the plane of the laser beams. The planar position of the laser receiver 160 is determined by the triangulation technique described above in conjunction with the surveying and marking apparatus. In other words, the two angles, $\phi_A$ and $\phi_B$, are calculated according to the ratio of the time intervals defined by the receipt of the radio signals and detection of the laser beams, and are, optionally, converted into XX-YY, X-Y, or other coordinate systems. The measured elevation of the grading implement 152 is determined according to the height at which the datum laser beam strikes the laser receiver mast 160. Using the measured planar position, the computer determines a desired elevation of the grading implement 152, where the desired elevation can be retrieved from the data base 168 or interpolated from elevation-defining data stored therein. The difference between the desired and measured elevations of the grading implement 152 is an elevation error thereof, and is displayed to the operator of the earth-moving vehicle 150 using the error indicator 164. By knowing the magnitude and direction of the elevation error, the operator of the earth-moving vehicle can adjust the position of the grading implement so as to reduce or eliminate the elevation error so that the vehicle will grade the site to the desired elevation. Since the implement sensing apparatus continually recomputes the planar position of the laser receiver, the desired elevation need not be a fixed distance from the datum plane 158, but, rather, can vary according to the planar position.

In operation as an implement control apparatus, the implement controller 174 is utilized to automatically control the height of the grading implement 152 as a function of the planar position of the laser receiver 160. The implement control apparatus operates like the implement sensing apparatus in computing an elevation error of the grading implement as a function of the planar position of the laser receiver 160 and vehicle 150, but adds the step of automatically adjusting the height of the grading implement in order to reduce the elevation error thereof. The implement controller 174 is preferably a hydraulic control device that, in response to an elevation error signal, causes the hydraulic cylinders 154 to vary the height of the grading implement in such a way as to reduce or eliminate the elevation error. If the elevation error is of great magnitude, which may occur if a large cut or fill is required at that vehicle position, the capabilities of the earth-moving vehicle may dictate that several grading passes will be required to produce the desired graded surface. In such a case, the controller 174 would reposition the grading implement 152 for that particular grading pass at a position that reduces but does not totally eliminate the elevation error.

In addition to sensing and/or automatically controlling the elevation of the grading implement, it may be advantageous to also sense and/or control the lateral position of the grading implement. As shown in FIG. 17, the earth-moving vehicle 150 is grading to a desired lateral contour 182. The contour 182, which may, for example, represent the edge of a road, is defined within the data base. In order to produce the desired contour 182, the right edge 184 of the grading implement 152 must follow the contour. Accordingly, the computer includes means for determining the lateral position of the right edge 184 of the grading implement based on the measured position of the earth-moving vehicle and grading implement and for computing a desired lateral position thereof based on the data base representation of the desired contour 182. A lateral positioning error is computed as the difference between the actual and desired lateral position of the grading implement. The lateral positioning error can be displayed to the operator on the error indicator 164 and/or can be used by the implement controller 174 to automatically adjust the lateral position of the grading implement so that the desired lateral contour is produced. Additionally, the control system may include a vehicle steering controller 186 (FIG. 15) that automatically steers the earth-moving vehicle along the desired lateral contour.

In the above discussion of the implement sensing and control apparatus and method, it has been assumed that only the elevation or lateral position of the grading implement 152 needs to be controlled in order to produce the desired graded surface. While this may be true in certain cases, such as grading a flat surface or when using earth-moving vehicles such as bulldozers or trenching machines, more generally, this assumption is not correct. Since the desired graded surface is often inclined, the grading implement may necessarily be sloped in order to produce the desired graded surface.

For example, if the desired graded surface is a constant-slope incline and if the grading implement is disposed at right angles to the direction of travel of the earth-moving vehicle, then the grading implement will be horizontal only if the vehicle is moving directly up or down the fall-line of the incline. If the vehicle is moving at right angles to the fall-line of the incline, then the desired slope of the grading implement is equal to the angle of the incline. If the grading implement is oriented in any other direction, then the desired slope of the grading implement will be some intermediate value between the angle of the incline and horizontal. Thus, in general, the desired attitude of the grading implement is a function not only of the planar position, but also of the orientation of the grading implement.

In order to deal with the general situation wherein both the planar position and orientation of the grading implement effects the desired attitude thereof, the implement sensing and control apparatus and method preferably includes means for measuring both the planar position and orientation of the grading implement, and also includes means for determining the desired elevation and slope of the grading implement as a function of the measured position and orientation thereof.

One approach is to determine elevation errors at both ends of the grading implement 152 by utilizing two laser receiver masts 160, each coupled to opposite ends of the grading implement, as shown in FIG. 18. In this embodiment, the remote processing unit 162 would include two channels of processing, one operable for determining the planar position and elevation of the left mast 188, and the other operable for determining the planar position and elevation of the right mast 190. The planar position of the left mast would be determined according to the measured angles $\phi_{AL}$ and $\phi_{BL}$, while the planar position of the right mast would be determined according to the measured angles $\phi_{AR}$ and $\phi_{BR}$, as shown in FIG. 19. The elevation of the left side of the grading implement 152 would be determined according to the height at which the datum laser beam strikes the left mast 188, while the elevation of the right side of the grading implement would be determined according to the height at which the datum laser beam strikes the right mast 190. Once the planar position and measured elevation for each end of the grading implement are determined, the desired elevation at each end can be found from the elevation-defining data stored in the data base 168, and an elevation error for each end of the grading implement can be computed. The error indicator 164 or the implement controller 174, in this embodiment, includes two channels to respectively indicate or correct for the two elevation errors.

An alternative approach is shown in FIG. 20 wherein a single laser receiver mast 160 and associated single channel remote processing unit 162 are utilized, as described above, to determine the planar position and elevation of the grading implement. In this embodiment, the remote processing unit 162 additionally includes an implement orientation sensor 180 (FIG. 15) that senses the orientation of the grading implement with respect to a datum direction, such as north, and senses the slope of the grading implement with respect to another datum such as a horizontal plane. Knowing the orientation of the grading implement plus the planar position and elevation thereof, the computer 166 can determine a desired slope of the grading implement. By subtracting the measured slope from the desired slope thereof, a implement slope error can be found. The implement slope error can be displayed on the indicator 164 along with the elevation error, and/or can be utilized by the implement controller 174 to automatically adjust the slope of the implement to reduce the slope error.

Figure 21:
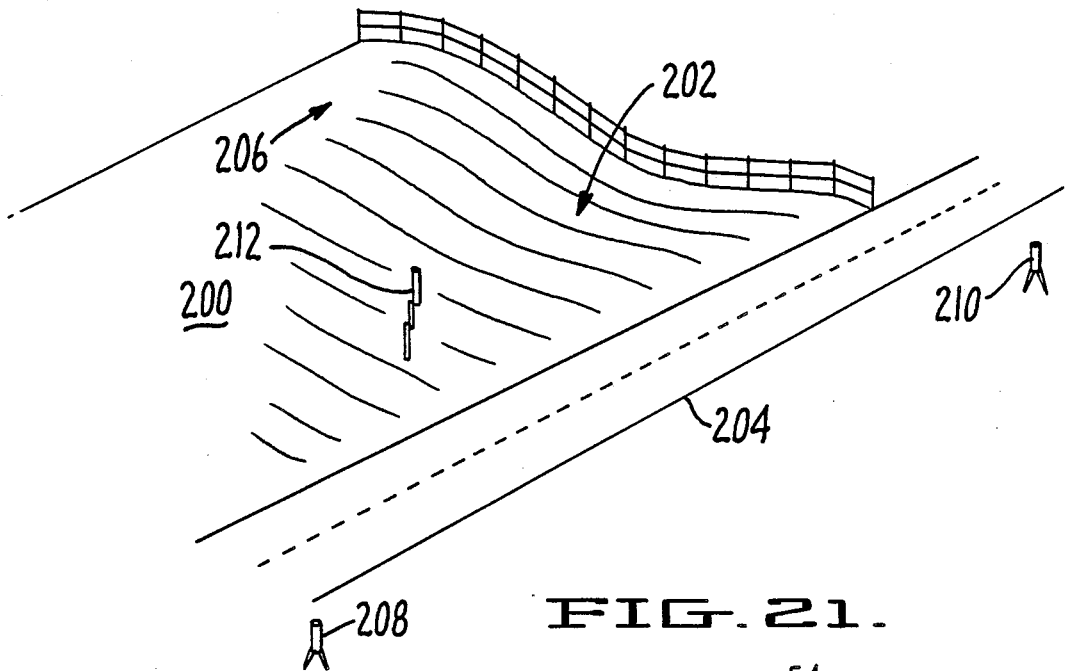
FIG. 21 is a perspective view of the position sensing apparatus of FIG. 1 set up for surveying a tract of land.

FIGS. 21-24 illustrate the processes of surveying and marking a plot of land 200 utilizing various aspects of the present invention, and of developing a contour map, a site plan, and a cut-fill map, from the information obtained from surveying. FIG. 21 shows the plot of land 200 in its natural state, falling downward into a dip 202 from the edge of a road 204, and then rising upward toward the crest of a hill 206. In order to survey the plot of land 200, two reference stations 208 and 210 are set up across the road with their laser beams sweeping across an area that includes the plot of land and the opposite reference station. The reference stations are positioned at known locations, known with reference to two bench mark locations through the use of the calibration technique described above.

Figure 22:
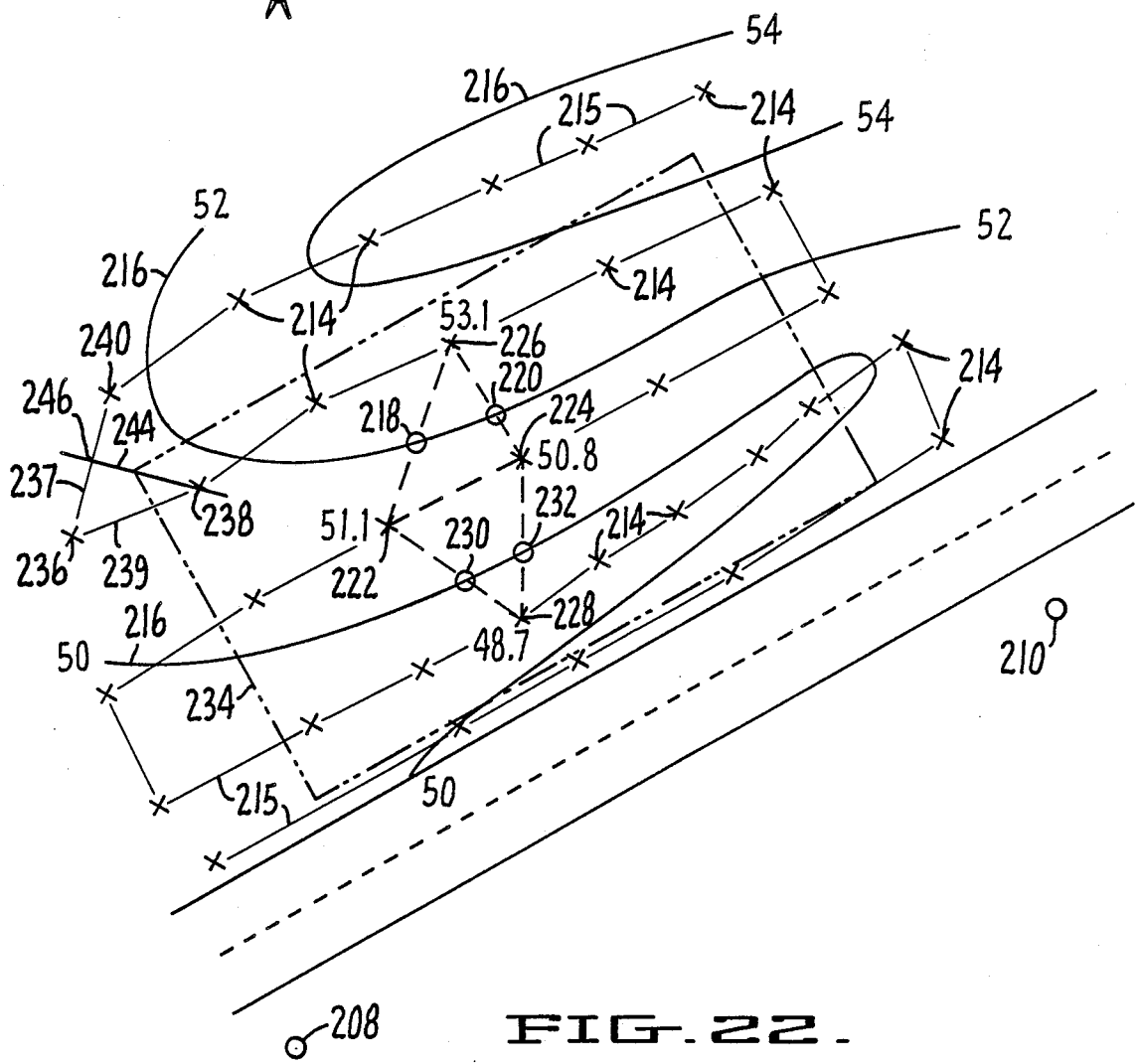
FIG. 22 is a contour map of the tract of land of FIG. 21.

The surveying process, according to the present invention, involves sequentially placing the portable receiver 212 at various locations 214 throughout the plot of land 200, and at each location measuring the planar position of the receiver with respect to the reference stations and measuring the elevation of the receiver with respect to the datum laser beam. Once the reference stations have been set up and calibrated, the data gathering portion of the surveying process is a one-person job, assuming only one receiver 212 is used. Of course more than one receiver 212 and associated operator could be utilized to speed up the data gathering process. Preferably, the receiver 212 is sequentially positioned at various locations 214 along the bottom of the dip 202, along the crest of the hill 206, and at enough positions throughout the plot of land and just outside the boundaries thereof to adequately cover the plot of land. The locations 214 are preferably selected so that the ground along the line segments 215 that connect the locations 214 is straight, i.e., has a constant slope, either zero or non-zero. A suggested pattern of survey locations is shown in FIG. 22. The measured planar position and elevation of each location is stored in the portable computer for later use.

Once the entire site has been covered by the data gathering process, the data obtained can be reduced to a more visually useful form by creating a contour map that includes constant elevation lines 216. The process of determining the locations of the selected constant elevation lines involves interpolating between adjacent survey points whose elevations span the elevation of the line. For example, to compute points 218 and 220 along the fifty-two foot elevation line, one would first locate survey points whose elevations are close to fifty-two feet. Points 222, 224, and 226 satisfy that condition. One would then linearly interpolate between two points, such as 222 and 226 or 224 and 226, to determine where on the straight line therebetween the elevation is equal to fifty-two feet. The same steps are followed to find additional points along the rest of the constant elevation lines. The lines between points 222 and 228 and 224 and 228 define two points, 230 and 232, along the fifty foot elevation line. Once all the interpolation has been done, the constant elevation lines are generated by simply connecting the points.

The data obtained through the surveying process can also be used for generating a site plan and for estimating the elevations at various key locations on the site plan. As shown in FIG. 22, if it is desired to grade the plot of land 200 into a rectangular parking lot 234, the elevations at the corners of the lot may be useful to know. In such case, an interpolation routine using two nearby line segments 237 and 239 can be used to estimate the elevation of corner 242. The interpolation involves first defining a straight line 244 that passes through the corner of the lot at point 242 and through one or both line segments. The line 244 may pass through one end point and one line segment 237, as shown, or may pass through both line segments. The elevation at point 246 is determined by linear interpolation between the two end points 236 and 240 of line segment 237, the elevations of which are known from the survey operation. The elevation at point 242 is then determined by linear interpolation between the elevations at points 238 and 246.

Figure 23:
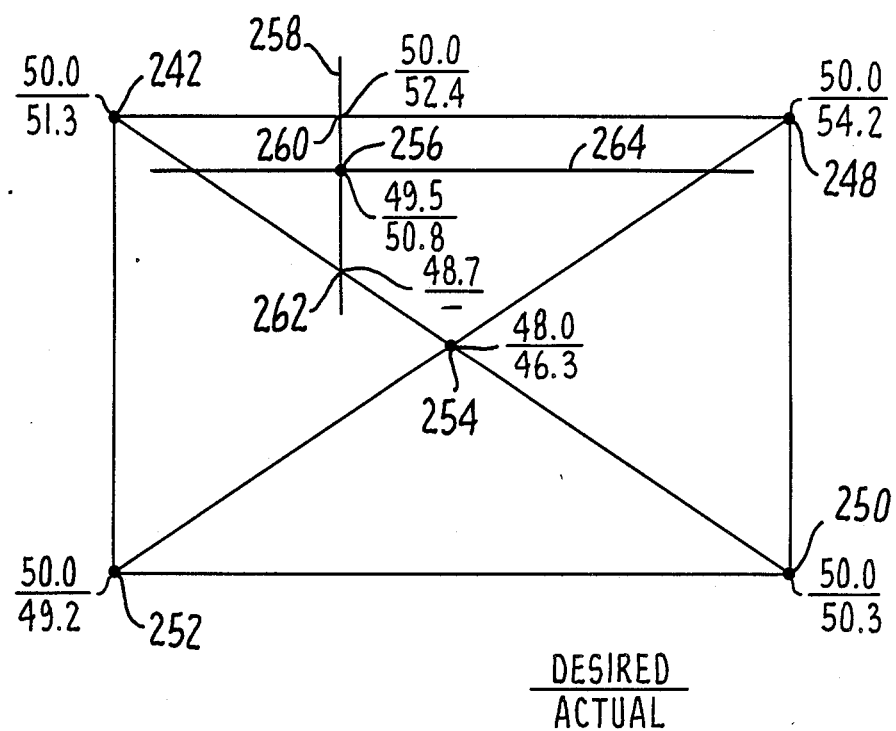
FIG. 23 is a site plan illustrating elevation-defining line segments that define the desired graded surface of the tract of land of FIG. 21.

A site plan, as shown in FIG. 23, defines the desired graded surface in terms of planar positions and elevations of several key locations, such as corners 242, 248, 250, and 252 and drain 254. According to the present invention, the desired elevations of points along the connecting line segments between those key locations are found by linear interpolation between the elevations of the end points of the lines, while points interior of the connecting line segments are determined as if the triangular space between three connecting line segments defines a plane. To find the desired elevation of a point 256 within the triangle defined by points 242, 248 and 254, a line 258 is drawn through the point 256 and through the two sides of the triangle. The elevation at each intersection of the line 258 and the triangle is determined by linear interpolation. For instance, in the illustrated example, the desired elevation at point 260 is equal to 50.0 feet, because the entire line between points 242 to 248 has a desired elevation of 50.0 feet. Also, the desired elevation at point 262 is 48.7 feet, based on a linear interpolation between the 50.0 foot desired elevation at point 242 and the 48.0 foot desired elevation at point 254. The desired elevation at point 256 is then found to be 49.5, based on a linear interpolation between the 50.0 foot desired elevation at point 260 and the 48.7 foot desired elevation at 262. Alternatively, another line 264 could be used to find the desired elevation at point 252, but the result should be the same. Also alternatively, a line (not shown) could be drawn through point 256 and one of the vertices 242, 248 or 254 of the triangle, and the elevation at point 256 would be determined by linear interpolation between the desired elevation of the vertex and the elevation at the intersection of the line and a side of the triangle. Thus, the site plan is defined according to the desired elevations of the end points of the line segments and the desired elevation at any point within the site plan can be calculated by interpolation between nearby line segments.

This technique for determining the desired elevation at a point based on the elevations for adjacent points can also be used, according to the present invention, in determining cut and fill information while marking, or in determining elevation errors during implement sensing or control with the present invention.

Figure 24:
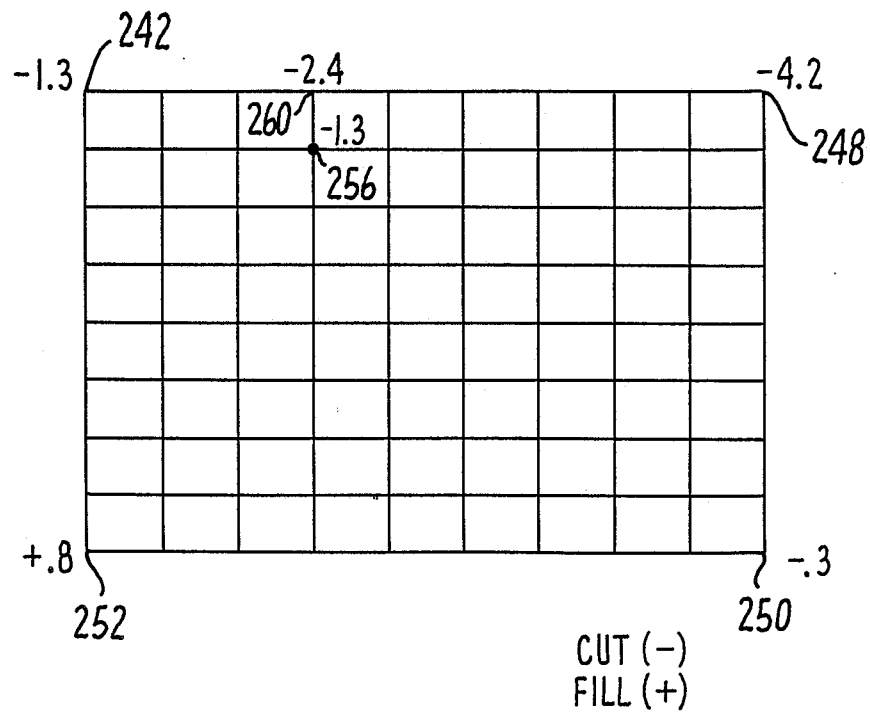
FIG. 24 is a grid map illustrating the depth of cut or fill that will be required to transform the tract of land of FIG. 21 into the desired graded surface defined by the site plan of FIG. 23.

Once the site plan has been defined and the site has been surveyed, a cut-fill map can be calculated, as shown in FIG. 24. The pre-existing land elevations within and along the boundaries of the site plan can either be estimated from the survey data, as described above, or may be remeasured through a marking procedure. The marking procedure would involve defining those locations where an elevation measurement is desired, positioning the receiver 212 and measuring the elevation at each of those locations. Knowing the desired and actual elevations of the land, the cut-fill map is calculated by simply subtracting the two sets of values. For example, the desired elevation of corner 242 of the parking lot is 50.0 feet, while the estimated elevation is 51.3 feet. The difference, 1.3 feet is the depth of cut that will be required at that point to create the desired 50 foot elevation. The cut-fill map is useful for estimating the job and for planning the task of grading.

Figure 25:
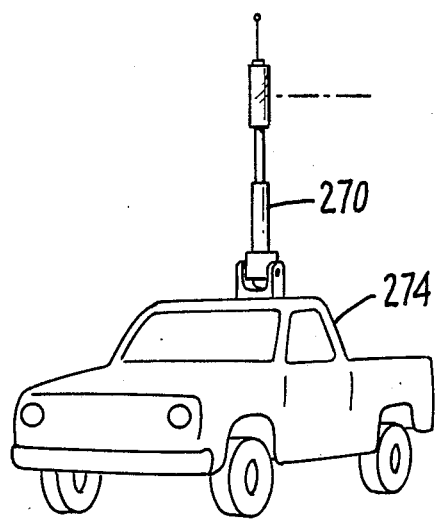
FIG. 25 is a perspective view of a portable sensing station mounted on a surveying vehicle, according to an alternative embodiment of the present invention.
Figure 26:
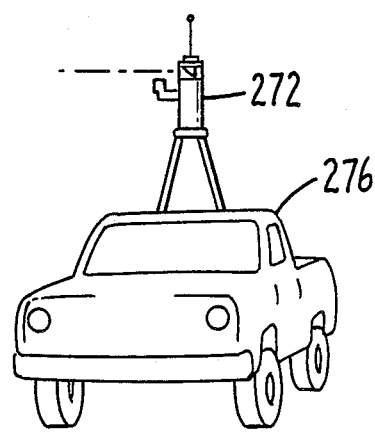
FIG. 26 is a perspective view of a reference station mounted on a vehicle, according to an alternative embodiment of the present invention.

Having thus described the preferred embodiments of the present invention, a number of alternative embodiments deserve mention. As shown in FIGS. 25 and 26, a portable sensing station 270 or a reference station 272 can be mounted in vehicles 274 or 276 for ease of transportation and to speed up the process of obtaining data with the present invention. A vehicle-mounted portable sensing station 270 can speed up the surveying or marking process by reducing the time to transport the portable sensing station between locations to be surveyed or marked.

Figure 27:
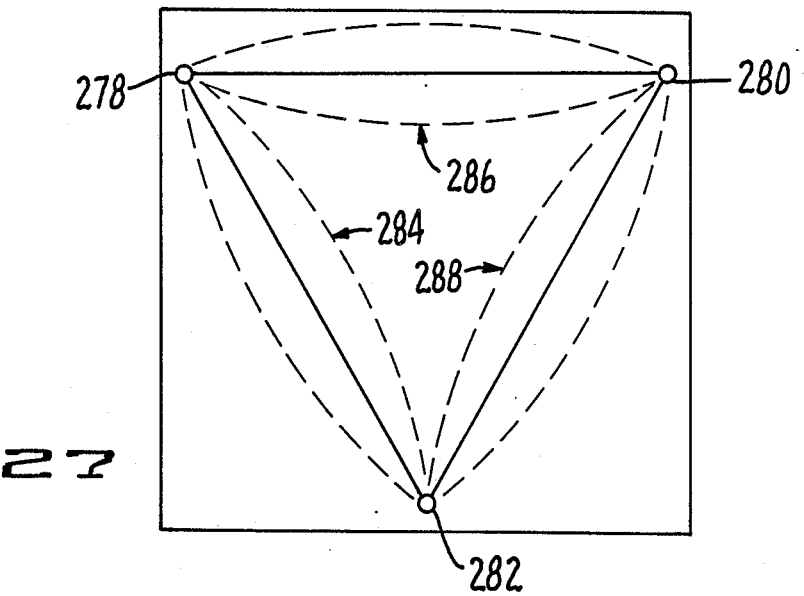
FIG. 27 is a plan view diagram of an alternative embodiment of the present invention wherein three reference stations are employed.

In FIG. 27, three reference stations 278, 280, and 282 can be used simultaneously to improve the area of coverage and accuracy of the present invention. In the regions 284, 286, and 288 near the connecting lines between reference stations, the position sensing accuracy of that pair of two reference stations is poor. However, the other two pairs of reference stations can accurately determine positions in those regions. In areas near each reference station, the other pair of reference stations can be used to accurately determine position. In all other regions, all three pairs of reference stations can be used to measure position. In regions where more than one pair of reference stations can be used for position sensing, position sensing accuracy can be improved by averaging the results of the position sensed by each pair. In order for the position sensing system to know which pair or pairs of reference stations to use, a provisional position can be determined and used to select the pair or pairs of reference stations to be used to determine the recorded position.

Figure 28:
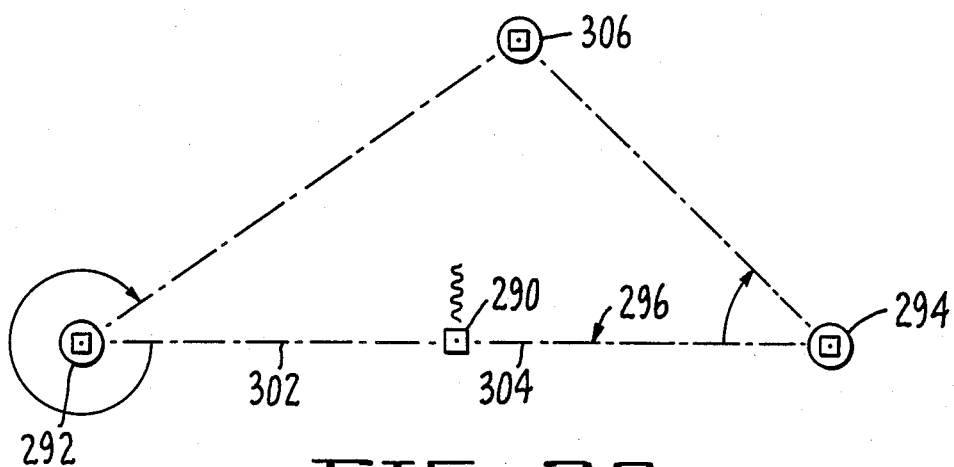
FIG. 28 is a plan view diagram of an alternative embodiment of the present invention wherein a laser beam detector station is located apart from the two reference stations.

In FIG. 28, an alternative is shown to the above-described mounting of the laser detectors 20 and radio signal transmitters 22 on the reference stations. In this alternative embodiment, the laser detectors and radio signal transmitters are positioned at point 290, which is intermediate to the locations of the two laser transmitters 292 and 294. If point 290 lies on the line 296 extending between the two laser transmitters, then the line 296 is the reference line for purposes of defining both angles 298 and 300. If not, each line segment 302 and 304 functions as a separate reference line. The position of the receiver 306 can be determined with respect to the laser transmitters 292 and 294 and the non-coincident reference lines 302 and 304, although the mathematics involved is more complex than disclosed above for the case where the two reference lines are coincident. The locations of the laser transmitters 292 and 294 and the two reference lines 302 and 304 can be determined through a calibration procedure using three bench mark locations.

The depth of disclosure herein, while lacking great detail in the specific design of individual components of the present invention, is sufficient for one of ordinary skill to construct the present invention. It is well known in the art to construct laser transmitters and detectors, radio transmitters and receivers, hydraulic controllers, error indicators, programmed computers, electronic interfaces, data bases, and other apparatus that will accomplish the functions of the present invention as set forth herein.

From the above description, it will be apparent that the invention disclosed herein provides a novel and advantageous three-dimensional position sensing apparatus and method utilizing laser reference stations and one or more portable position sensors. The foregoing discussion discloses and describes merely exemplary methods and embodiments of the present invention. As will be understood by those familiar with the art, the invention may be embodied in other specific forms without departing from the spirit or essential characteristics thereof. For example, the laser beams could be projected on the same plane and the radio signals could be broadcast at the same frequencies, but the portable sensing station could still distinguish between the two laser beams and radio signals if the period of the two lasers are different. Also, the three timer circuit 116 could be constructed in many different alternative ways with the same or a different number of timers. Also, the definition of location in terms of angles and the formulas for calculating position or transforming position data to other coordinate systems could be modified. Also, certain portions of the portable sensing station, such as the computer, could be located at a distance from but electrically coupled to the receiver. Multiple receivers can be used and coupled either to separate computers or to a central computer. Also, the laser beams need not rotate at constant angular velocities because the computer could compensate for any perturbations in the angular velocities of the laser beams during its timing and angle calculations. As mentioned above, non-horizontal datum planes may be used. Accordingly, the disclosure of the present invention is intended to be illustrative, but not limiting, of the scope of the invention, which is set forth in the following claims.

What is claimed is:

1. A position sensing apparatus comprising:
   a first energy beam transmitter operable for projecting a first energy beam that sweeps in a plane across an area in which position sensing is to occur;
   first reference signal means for generating a first reference signal when said first energy beam is aligned with a first reference line;
   a second energy beam transmitter operable for projecting a second energy beam that sweeps in a plane across said area, wherein said first and second energy beam transmitters are positioned apart;
   second reference signal means for generating a second reference signal when said second energy beam is aligned with a second reference line;
   an energy beam receiver operable for detecting said first and second energy beams, wherein said energy beam receiver is placed at a location at which the position is to be determined;
   a reference signal receiver operable for receiving said first and second reference signals; and
   processing means coupled to said energy beam and reference signal receivers and responsive to the timing of the detection of said energy beams relative to the receipt of said reference signals for determining the position of said energy beam receiver relative to said reference lines and said energy beam transmitters.

2. An apparatus as recited in claim 1 wherein the orientations of said reference lines and the positions of said energy beam transmitters are known relative to an origin, and wherein said processing means includes means for transforming the measured position of said energy beam receiver relative to said reference lines and said energy beam transmitters into a position relative to said origin.

3. An apparatus as recited in claim 1 wherein said first and second energy beams are laser beams, and wherein said energy beam receiver includes detection means that are operable for detecting laser light.

4. An apparatus as recited in claim 1 wherein said first energy beam rotates in a first plane and said second energy beam rotates in a second plane that is substantially parallel to and spaced apart from said first plane.

5. An apparatus as recited in claim 4 wherein both said first and second planes are substantially horizontal.

6. An apparatus as recited in claim 1 wherein said first energy beam sweeps at a constant angular velocity, and wherein said processing means includes means for determining the angle between said first reference line and a line extending from said first energy beam transmitter to said energy beam receiver according to the ratio of the time interval between the detection of said first energy beam by said energy beam receiver and the receipt of said first reference signal by said reference signal receiver to the time interval defined by the rotational period of said first energy beam.

7. An apparatus as recited in claim 6 wherein said second energy beam sweeps at a constant angular velocity, and wherein said processing means includes means for determining the angle between said second reference line and a line extending from said second energy beam transmitter to said energy beam receiver according to the ratio of the time interval between the detection of said second energy beam by said energy beam receiver and the receipt of said second reference signal by said reference signal receiver to the time interval defined by the rotational period of said second energy beam.

8. An apparatus as recited in claim 7 wherein said processing means includes means for determining said rotational period of said first energy beam according to the time period between the receipt of two successive first reference signals, and for determining said rotational period of said second energy beam according to the time period between the receipt of two successive second reference signals.

9. An apparatus as recited in claim 1 wherein said first reference signal means includes a first energy beam detector for detecting said first energy beam, and also includes first signalling means responsive to said first energy beam detector for generating said first reference signal upon detection of said first energy beam during each rotation of said first energy beam, wherein said first energy beam detector is positioned apart from said first energy beam transmitter and the line therebetween defines said first reference line.

10. An apparatus as recited in claim 9 wherein said second reference signal means includes a second energy beam detector for detecting said second energy beam, and also includes second signalling means responsive to said second energy beam detector for generating said second reference signal upon detection of said second energy beam during each rotation of said first energy beam, wherein said second energy beam detector is positioned apart from said second energy beam transmitter and the line therebetween defines said second reference line.

11. An apparatus as recited in claim 10 wherein said first energy beam detector is coupled to and located with said second energy beam transmitter, wherein said second energy beam detector is coupled to and located with said first energy beam transmitter, and wherein said first and second reference lines extend between said first and second energy beam transmitters.

12. An apparatus as recited in claim 1 wherein said first reference signal means is mounted on said second energy beam transmitter, wherein said second reference signal means is mounted on said first energy beam transmitter, whereby said first and second reference lines extend between said first and second energy beam transmitters.

13. An apparatus as recited in claim 1 wherein said first and second reference signal means are mounted together at a position separate from said first and second energy beam transmitters.

14. An apparatus as recited in claim 13 wherein said first and second reference signal means are positioned between and aligned with said first and second energy beam transmitters, whereby said first and second reference lines extend between said first and second energy beam transmitters.

15. An apparatus as recited in claim 1 wherein said first reference signal means broadcasts said first reference signal as a radio frequency signal, wherein said second reference signal means broadcasts said second reference signal as another radio frequency signal, and wherein said reference signal receiver includes a radio receiver that is operable for receiving and distinguishing between said radio frequency signals.

16. An apparatus as recited in claim 1 wherein one of said energy beams is a datum beam that defines a datum plane, and wherein said position sensing apparatus further comprises elevation measuring means for determining the elevation of a location according to the height at which said energy beam receiver detects said datum energy beam.

17. An apparatus as recited in claim 16 wherein said datum plane is substantially horizontal.

18. An apparatus as recited in claim 16 wherein said elevation measuring means includes a support of adjustable length for supporting said energy beam receiver and means for measuring the extension of said support at which said energy beam receiver detects said datum energy beam.

19. An apparatus as recited in claim 16 wherein said energy beam receiver includes a linearly extending array of energy sensitive receiving cells including a datum cell, wherein said linearly extending array crosses said datum plane, and wherein said energy beam receiver is properly positioned for height measurement when said datum cell detects said datum energy beam.

20. An apparatus as recited in claim 19 wherein said energy beam receiver includes indicator means for indicating whether receiving cells above or below said datum cell are detecting said datum energy beam, wherein the detection of said datum energy beam by a receiving cell positioned above said datum cell indicates that said energy beam receiver is positioned too low, and wherein the detection of said datum energy beam by a receiving cell positioned below said datum cell indicates that said energy beam receiver is positioned too high.

21. An apparatus as recited in claim 1 further including a plurality of energy beam receivers, each placed at a location at which the position is to be determined and each coupled to said processing means, wherein said processing means includes means for determining the position of each of said energy beam receiver relative to said reference lines and said energy beam transmitters.

22. An apparatus as recited in claim 1 further comprising more than two energy beam transmitters, each operable for striking said energy beam receiver, and reference signal means associated with each energy beam transmitter for generating a reference signal when the associated energy beam is aligned with a corresponding reference line, and wherein said processing means further includes means responsive to all energy beams and reference signals for determining the position of said energy beam receiver relative to said reference lines and said energy beam transmitters.

23. A position sensing apparatus comprising:
a first laser beam transmitter operable for projecting a first laser beam that rotates at a constant angular velocity in a first plane, wherein said first plane defines a datum plane;
a second laser beam transmitter operable for projecting a second laser beam that rotates at a constant angular velocity in a second plane substantially parallel to said first plane, wherein said first and second laser beam transmitters are positioned apart at known locations;
a first laser beam detector mounted to said second laser beam transmitter and operable for detecting when said first laser beam strikes said first laser beam detector;
a first radio transmitter coupled to said first laser beam detector and operable for broadcasting a first reference signal each time said first laser beam strikes said first laser beam detector;
a second laser beam detector mounted to said first laser beam transmitter and operable for detecting when said second laser beam strikes said second laser beam detector;
a second radio transmitter coupled to said second laser beam detector and operable for broadcasting a second reference signal each time said second laser beam strikes said second laser beam detector;
a laser beam receiver that is placed at a location at which the position is to be determined and operable for detecting said first and second laser beams during each rotation thereof, wherein said laser beam receiver includes means for measuring the height at which said laser beam receiver receives said first laser beam;
a radio receiver operable for receiving said first and second reference signals; and
processing means coupled to said laser beam and radio receivers and responsive to the timing of the detection of said laser beams by said laser beam receiver relative to the receipt of said reference signals by said radio receiver for determining the position in the plane of the laser beams of said laser beam receiver relative to the known locations of said laser beam transmitters and for determining the elevation at each location according to said height measured by said laser beam receiver, wherein said processing means further includes means for recording the measured position and elevation of each location.

24. An apparatus as recited in claim 23 wherein said processing means includes means for determining the position of said laser beam receiver at the intersection of first and second lines projected in the datum plane and extending between respective first and second laser beam transmitters and the laser beam receiver, wherein the first and second lines as projected in the datum plane form respective first and second angles in the datum plane with respect to a reference line extending between said laser beams transmitters and projected in the datum plane, wherein said means includes means for determining said first angle according to the ratio of the time interval between the detection of said first laser beam by said laser beam receiver and the receipt of said first reference signal by said radio receiver of the time interval defined by the period of rotation of said first laser beam, and wherein said means includes means for determining said second angle according to the ratio of the time interval between the detection of said second laser beam by said laser beam receiver and the receipt of said second reference signal by said radio receiver to the time interval defined by the period of rotation of said second laser beam.

25. An apparatus comprising:
first and second reference stations positioned apart at known locations during position sensing operations utilizing said apparatus, wherein each reference station includes a laser beam transmitter that projects a laser beam that periodically sweeps at a constant angular velocity in a plane across an area in which position sensing is to occur and that periodically strikes the other reference station and a portable receiver, includes a detector for detecting the laser beam from the other laser beam transmitter, and includes a radio transmitter coupled to said detector for broadcasting a reference signal upon each detection of the other laser beam by said detector, and wherein one of said laser beams is a datum laser beam that defines a datum plane;
a portable receiver that is placed at a location at which the position is to be determined, wherein said portable receiver includes a laser beam receiver operable for detecting the two laser beams, includes a radio receiver operable for receiving the two reference signals, and includes means for measuring the height at which said datum laser beam strikes said laser beam receiver; and
processing means coupled to said portable receiver and responsive to the timing of the detection of said laser beams by said laser beam receiver relative to the receipt of said reference signals by said radio receiver for determining the position in said datum plane of said portable receiver relative to the locations of said laser beam transmitters, and responsive to the height measured by said laser beam receiver for determining the elevation of each location relative to said datum plane.

26. An apparatus as recited in claim 25 wherein said processing means further includes means for recording the measured position and elevation of said portable receiver relative to said laser beam transmitters and includes means for transforming the measured position and elevation of said portable receiver into one or more alternative coordinate systems.

27. An apparatus as recited in claim 25 further comprising data base means coupled to said processing means for defining the positions relative to said reference stations of one or more locations to be marked, and position error means coupled to said processing means for indicating a positional error of said portable receiver relative to a particular location to be marked, wherein the position of said portable receiver defines the location to be marked when the positional error is substantially equal to zero.

28. An apparatus as recited in claim 25, wherein said processing means further includes means for measuring the actual elevation of a grading implement mounted on an earth-moving vehicle, wherein said portable receiver is coupled to the grading implement for movement therewith, wherein said apparatus further comprises data base means for defining a desired elevation of the grading implement as a function of the position of the grading implement, and computational means for determining an elevation error of the grading implement according to the difference between the measured and desired elevations thereof.

29. An apparatus as recited in claim 28, further comprising automatic control means responsive to said elevation error for automatically adjusting the elevation of the grading implement to reduce said elevation error.

30. An apparatus as recited in claim 28 further comprising means for sensing the lateral position of the grading implement and for determining a lateral positioning error of the grading implement relative to a desired lateral position.

31. An apparatus as recited in claim 30, further comprising automatic control means responsive to said elevation error for automatically adjusting the elevation of the grading implement to reduce said elevation error, and means for controlling the lateral position of the grading implement by laterally shifting the grading implement relative to the earth-moving vehicle to reduce said lateral positioning error.

32. An apparatus as recited in claim 31 wherein said means for controlling the lateral position of the grading implement further includes means for automatically steering the earth-moving vehicle to reduce said lateral positioning error.

33. A surveying apparatus for determining the position of one or more locations to be surveyed, said apparatus comprising:
a first energy beam transmitter operable for projecting a first energy beam that sweeps in a plane across the area to be surveyed;
first reference signal means for generating a first reference signal when said first energy beam is aligned with a first reference line;
a second energy beam transmitter operable for projecting a second energy beam that sweeps in a plane across the area to be surveyed, wherein said first and second energy beam transmitters are positioned apart during a surveying operation;
second reference signal means for generating a second reference signal when said second energy beam is aligned with a second reference line;
an energy beam receiver operable for detecting said first and second energy beams, wherein said energy beam receiver is sequentially positioned at each location to be surveyed;
a reference signal receiver operable for receiving said first and second reference signals; and
processing means coupled to said energy beam and reference signal receivers and responsive to the timing of the detection of said energy beams relative to the receipt of said reference signals for determining the position of said energy beam receiver at each location to be surveyed relative to said reference lines and said energy beam transmitters, wherein said processing means further includes means for recording the measured position of each location to be surveyed.

34. An apparatus as recited in claim 33 wherein one of said energy beams is a datum beam that defines a datum plane, wherein said surveying apparatus further comprises elevation measuring means for determining the elevation of a location according to the height at which said energy beam receiver detects said datum energy beam, and wherein said processing means further includes means for recording the measured elevation of said energy beam receiver.

35. An apparatus as recited in claim 34 wherein said processing means further includes means for transforming the measured position and elevation of said energy beam receiver into one or more alternative coordinate systems.

36. An apparatus for positioning markers at one or more locations to be marked, said apparatus comprising:
a first energy beam transmitter operable for projecting a first energy beam that sweeps in a plane across the area to be marked;
first reference signal means for generating a first reference signal when said first energy beam is aligned with a first reference line;
a second energy beam transmitter operable for projecting a second energy beam that sweeps in a plane across the area to be marked, wherein said first and second energy beam transmitters are positioned apart during a marking operation;
second reference signal means for generating a second reference signal when said second energy beam is aligned with a second reference line;
an energy beam receiver operable for detecting said first and second energy beams, wherein said energy beam receiver is sequentially positioned at each location to be marked;
a reference signal receiver operable for receiving said first and second reference signals;
processing means coupled to said energy beam and reference signal receivers and responsive to the timing of the detection of said energy beams relative to the receipt of said reference signals for determining the position of said energy beam receiver relative to said energy beam transmitters;
data base means coupled to said processing means for defining the positions relative to said energy beam transmitters of the locations to be marked; and
position error means coupled to said processing means for indicating a positional error of said energy beam receiver relative to a location to be marked, wherein the position of said energy beam receiver defines the location to be marked when said positional error is substantially equal to zero.

37. An apparatus as recited in claim 36 wherein one of said energy beams is a datum energy beam that rotates in a datum plane, wherein said apparatus further comprises elevation measuring means for determining the elevation of each location to be marked according to the height at which said energy beam receiver detects said datum energy beam, wherein said data base means further defines a desired elevation at each location to be marked, and wherein said position error means includes means for determining an elevation error at each location to be marked according to the difference between the measured elevation and said desired elevation.

38. A reference station for use with another like reference station and one or more portable receivers for position sensing, wherein during a position sensing operation the reference stations are spaced apart at known positions and the portable receiver is placed at a location at which the position is to be determined, said reference station comprising:
a housing;
an energy beam transmitter mounted to said housing and operable for projecting a first energy beam that sweeps in a plane, wherein during a position sensing operation said first energy beam periodically strikes another reference station and a portable receiver;
an energy beam detector mounted to said housing and operable for detecting when the energy beam from the other reference station strikes said energy beam detector during a position sensing operation; and
reference signal means mounted to said housing and responsive to the detection of the energy beam of the other reference station by said energy beam detector for generating a reference signal to the portable receiver.

39. A reference station as recited in claim 38 wherein said energy beam transmitter includes means for sweeping said first energy beam at a constant angular velocity in a plane across an area within which position sensing is to occur.

40. A reference station as recited in claim 38 wherein said reference signal means includes means for generating said reference signal by broadcasting a radio frequency signal upon each detection of the other energy beam.

41. A portable sensing station for use with two or more reference stations for position sensing, wherein during a position sensing operation the reference stations are spaced apart at known positions, wherein each of the reference stations projects an energy beam that sweeps in a plane and periodically strikes the other reference station and said portable sensing station, and wherein each of the reference stations generates a reference signal when the energy beam from the other reference station strikes it, said portable sensing station comprising:
an energy beam receiver operable for detecting energy beams striking said energy beam receiver, wherein said energy beam receiver is placed at a location at which the position is to be determined;
a reference signal receiver operable for receiving each of the reference signals from the reference stations; and
processing means coupled to said energy beam and reference signal receivers and responsive to the timing of the detection of the energy beams by said energy beam receiver relative to the receipt of the reference signals by said reference signal receiver for determining the position in the plane of the energy beams of said energy beam receiver relative to the reference stations.

42. A portable sensing station as recited in claim 41 wherein one of said energy beams is a datum energy beam that sweeps in a datum plane, and wherein said portable sensing station further includes elevation measuring means for determining the elevation of each location to be surveyed according to the height at which said energy beam receiver detects said datum energy beam, and includes means for recording the measured position and elevation of said portable sensing station.

43. A portable sensing station as recited in claim 42 wherein said elevation measuring means includes a vertical support of adjustable length for supporting said energy beam receiver and means for measuring the extension of said vertical support at which said energy beam receiver detects said datum energy beam.

44. A portable sensing station as recited in claim 42 wherein said energy beam receiver includes a linearly extending array of energy sensitive receiving cells including a datum cell, wherein said linearly extending array crosses said datum plane, and wherein said energy beam receiver is properly positioned for height measurement when said datum cell detects said datum energy beam.

45. A portable sensing station as recited in claim 44 wherein said energy beam receiver includes indicator means for indicating whether receiving cells above or below said datum cell are detecting said datum energy beam, wherein the detection of said datum energy beam by a receiving cell positioned above said datum cell indicates that said energy beam receiver is positioned too low, and wherein the detection of said datum energy beam by a receiving cell positioned below said datum cell indicates that said energy beam receiver is positioned too high.

46. A portable sensing station as recited in claim 41, further comprising data base means coupled to said processing means for defining the positions relative to the reference stations of one or more locations to be marked, and position error means coupled to said processing means for indicating a positional error of said energy beam receiver relative to a location to be marked, wherein the position of said energy beam receiver defines the location to be marked when said positional error is substantially equal to zero.

47. A portable sensing station as recited in claim 46 wherein one of said energy beams is a datum energy beam that rotates in a datum plane, wherein said portable sensing station further includes elevation measuring means for determining the elevation of each location to be marked according to the height at which said energy beam receiver detects said datum energy beam.

48. A portable sensing station as recited in claim 47 wherein said data base means further defines a desired elevation at each location to be marked, and wherein said position error means includes means for determining an elevation error at each location to be marked according to the difference between the measured elevation and said desired elevation.

49. An apparatus for sensing the position and elevation of a grading implement mounted on an earth-moving vehicle and for determining an elevation error of the grading implement relative to a desired elevation, wherein the desired elevation of the grading implement at a particular position is the elevation that would allow the earth-moving vehicle and attached grading implement to produce a desired graded surface at that position, said apparatus comprising:
- a first energy beam transmitter operable for projecting a first energy beam that sweeps in a plane across the area to be graded and forms a datum plane;
- first reference signal means for generating a first reference signal when said first energy beam is aligned with a first reference line;
- a second energy beam transmitter operable for projecting a second energy beam that sweeps in a plane across the area to be graded, wherein said first and second energy beam transmitters are positioned apart during operation of said apparatus;
- second reference signal means for generating a second reference signal when said second energy beam is aligned with a second reference line;
- an energy beam receiver operable for detecting said first and second energy beams and for detecting the height at which said first energy beam strikes said energy beam receiver, wherein said energy beam receiver is coupled to a grading implement of an earth-moving vehicle for movement therewith;
- a reference signal receiver operable for receiving said first and second reference signals; and
- processing means coupled to said energy beam receiver and said reference signal receiver and responsive to the timing of the detection of said energy beams relative to the receipt of the respective reference signals for determining the position of the earth-moving vehicle relative to said energy beam transmitters, and responsive to the height at which said first energy beam strikes said energy beam receiver for determining the elevation of the grading implement, wherein said processing means includes data base means for defining the desired elevation of the grading implement as a function of the position of the earth-moving vehicle, and includes computational means for determining the elevation error of the grading implement according to the difference between the measured and desired elevations thereof.

50. An apparatus as recited in claim 49 further comprising indicator means mounted on the earth-moving vehicle for displaying the elevation error to the operator of the earth-moving vehicle.

51. An apparatus as recited in claim 49 further comprising control means coupled to the grading implement and responsive to the elevation error for automatically adjusting the elevation of the grading implement to reduce the elevation error.

52. An apparatus as recited in claim 49 wherein the desired graded surface is inclined and the grading implement may necessarily be sloped when producing the desired graded surface so that at any given position of the grading implement the desired slope thereof is a function of the orientation thereof, wherein said apparatus further comprises means for determining the orientation and slope of the grading implement, and wherein said processing means includes means for determining the desired elevation and slope of the grading implement as a function of the measured position and orientation thereof.

53. An apparatus as recited in claim 52 further comprising control means coupled to the grading implement for controlling the elevation and slope of the grading implement to produce the desired graded surface.

54. An apparatus as recited in claim 52 further comprising indicator means mounted on the earth-moving vehicle and coupled to said processing means for displaying to the operator of the earth-moving vehicle the elevation error and a slope error, wherein said slope error is the difference between the measured and desired slope of the grading implement.

55. An apparatus as recited in claim 49 wherein said energy beam receiver comprises a first energy beam receiver mast that is coupled to one side of the grading implement for movement therewith and a second energy beam receiver mast coupled to the opposite side of the grading implement for movement therewith, and wherein said processing means includes means for determining the slope of the grading implement from the measured elevation of each side of the grading implement.

56. A control system for an earth-moving vehicle for use in grading a plot of land to a desired contour, wherein said earth-moving vehicle includes a grading implement that defines the graded surface, said control system comprising:

first and second reference stations spaced apart at known positions and each including an energy beam transmitter operable for projecting an energy beam that sweeps at a constant angular velocity in a plane across the area to be graded and that periodically strikes the other reference station and a receiver, including an energy beam detector operable for detecting the energy beam from the other reference station, and including a reference signal transmitter responsive to the detection of the other energy beam by said energy beam detector and operable for periodically broadcasting a reference signal, wherein one of said energy beams is denoted a datum energy beam that defines a datum plane for elevation measurements;

a receiver mounted on an earth-moving vehicle, said receiver including an energy beam receiver operable for detecting when and the height at which said datum energy beam strikes said receiver, wherein said energy beam receiver is coupled to a grading implement for movement therewith, and including a reference signal receiver operable for receiving said reference signals broadcast from said reference stations;

position measuring means operatively coupled to said receiver and coupled to the earth-moving vehicle for movement therewith and responsive to the timing of the detection of the energy beams by said energy beam receiver relative to the receipt of the respective reference signals by said reference signal receiver for determining the position of the grading implement relative to said reference stations, and responsive to the height at which said datum energy beam strikes said receiver for determining the elevation of the grading implement relative to said datum plane;

data base means for defining the desired contour of the plot of land in terms of desired elevations of the grading implement relative to said datum plane as a function of the positions of the grading implement relative to said reference stations;

processing means responsive to the measured position and elevation of the grading implement and responsive to the desired elevation of the grading implement for determining an elevation error of the grading implement according to the difference between the measured and desired elevations of the grading implement; and automatic control means responsive to the elevation error for automatically adjusting the elevation of the grading implement to reduce the elevation error.

57. A control system as recited in claim 56 wherein the desired graded surface is inclined and the grading implement is necessarily sloped when producing the desired graded surface so that at any given position of the grading implement the desired slope thereof is a function of the orientation thereof, wherein said control system further comprises means for determining the orientation and slope of the grading implement, wherein said processing means includes means for determining the desired slope of the grading implement as a function of the measured position and orientation thereof and for determining a slope error of the grading implement according to the difference between the measured and desired slope of the grading implement, and wherein said automatic control means includes means responsive to said slope error for adjusting the slope of the grading implement to reduce said slope error.

58. A control system as recited in claim 56 further comprising means for sensing the lateral position of the grading implement and for determining a lateral positioning error of the grading implement relative to a desired lateral position, and means for controlling the lateral position of the grading implement by laterally shifting the grading implement relative to the earth-moving vehicle to reduce said lateral positioning error.

59. A control system as recited in claim 58 wherein said means for controlling the lateral position of the grading implement further includes means for automatically steering the earth-moving vehicle to reduce said lateral positioning error.

60. A method comprising the steps of:
projecting first and second energy beams from two transmitters that are spaced apart, wherein each of said energy beams periodically sweeps in a plane across an area within which position sensing is to occur;

generating a first reference signal when said first energy beam is aligned with a first reference line;

generating a second reference signal when said second energy beam is aligned with a second reference line;

detecting said first and second energy beams with an energy beam receiver that is placed at a location at which the position is to determined;

receiving said first and second reference signals by a reference signal receiver; and determining the position of said energy beam receiver relative to said reference lines and said transmitters according to the timing of detection of said energy beams by said energy beam receiver relative to the reception of said reference signals by said reference signal receiver.

61. A method as recited in claim 60 further comprising the steps of determining the positions of said transmitters relative to an origin, and transforming the measured position of said energy beam receiver relative to said reference lines and said transmitters into a position relative to said origin.

62. A method as recited in claim 61 wherein the positions of first and second bench marks are known relative to said origin, wherein said reference lines extend between said two transmitters, and wherein said step of determining the positions of said transmitters relative to an origin includes the steps of positioning said energy beam receiver at said first bench mark and detecting said first and second energy beams and receiving said first and second reference signals, determining the position of said first bench mark relative to said transmitters according to the timing of detection of said energy beams by said energy beam receiver while positioned at said first bench mark relative to the reception of said reference signals, repositioning said energy beam receiver at said second bench mark and detecting said first and second energy beams and receiving said first and second reference signals, determining the position of said second bench mark relative to said transmitters according to the timing of detection of said energy beams by said energy beam receiver while positioned at said second bench mark relative to the reception of said reference signals, and then determining the positions of said transmitters relative to said origin according to the measured positions of said bench marks relative to said transmitters and according to the positions of said bench marks relative to said origin.

63. A method as recited in claim 60 wherein said step of projecting said first and second energy beams includes the steps of projecting said first energy beam in a first plane and projecting said second energy beam in a second plane that is substantially parallel to and spaced apart from said first plane.

64. A method as recited in claim 63 wherein said step of projecting said first and second energy beams includes the step of projecting said first and second energy beams in substantially horizontal planes.

65. A method as recited in claim 60 wherein said step of projecting first and second energy beams includes the step of rotating said first energy beam in a plane at a constant angular velocity and rotating said second energy beam in a plane at a constant angular velocity, and wherein said step of determining the position of said energy beam receiver includes the steps of determining the separation distance between said two transmitters, determining the angle between said first reference line and a line extending from said first energy beam transmitter to said energy beam receiver according to the ratio of the time interval between the detection of said first energy beam and the receipt of said first reference signal to the time interval defined by the rotational period of said first energy beam, determining the angle between said second reference line and a line extending from said second energy beam transmitter to said energy beam receiver according to the ratio of the time interval between the detection of said second energy beam and the receipt of said second reference signal to the time interval defined by the rotational period of said second energy beam, and determining the position of said energy beam receiver according to said separation distance and said angular positions.

66. A method as recited in claim 60 wherein said step of generating a first reference signal includes the step of generating a first reference signal when said first energy beam strikes a detector mounted to the other transmitter, wherein said step of generating a second reference signal includes the step of generating a second reference signal when said second energy beam strikes a detector mounted to the other transmitter, whereby said first and second reference lines extend between said two transmitters.

67. A method as recited in claim 60 wherein said steps of generating first and second reference signals includes the steps of broadcasting respective first and second radio frequency signals, and wherein said step of receiving said first and second reference signals includes the step of receiving and distinguishing between said first and second radio frequency signals.

68. A method as recited in claim 60 wherein said step of projecting first and second energy beams includes the step of projecting one of said energy beams as a datum energy beam in a datum plane, and wherein said method further comprises the step of determining the elevation of the location of the energy beam receiver according to the height at which said energy beam receiver detects said datum energy beam.

69. A method as recited in claim 68 wherein said step of determining the elevation of the location of the energy beam receiver includes the step of determining the elevation of said datum plane and subtracting therefrom the height above ground at which said energy beam receiver detects said datum energy beam.

70. A method as recited in claim 68 wherein said step of detecting said first and second energy beams includes the step of adjusting the elevation of an array of detector cells of said energy beam receiver until a datum cell of said array detects said datum energy beam, and wherein said step of determining the elevation of the location of said energy beam receiver includes the step of determining the height at which said datum cell detects said datum energy beam.

71. A method for surveying as recited in claim 68 further comprising the step of recording the measured position and elevation of said energy beam receiver.

72. A method as recited in claim 60, further comprising the steps of defining the positions relative to said energy beam transmitters of one or more locations to be marked, positioning said energy beam receiver near a location to be marked, indicating a positional error of said energy beam receiver relative to the location to be marked, repositioning said energy beam receiver until said positional error is substantially equal to zero, and marking the position of said energy beam receiver when said positional error is substantially equal to zero.

73. A position sensing method comprising the steps of:
projecting a first laser beam in a first plane at a constant angular velocity and projecting a second laser beam in a second plane substantially parallel to said first plane at a constant angular velocity, wherein said first and second laser beams are transmitted from respective first and second laser beam transmitters that are positioned apart by a known distance, wherein the line between said laser beam transmitters defines a reference line, and wherein said first and second laser beams periodically sweep across an area with which position sensing is to occur and also periodically strike the other laser beam transmitter;
broadcasting a first reference signal each time said first laser beam strikes a detector mounted on said second laser beam transmitter;
broadcasting a second reference signal each time said second laser beam strikes a detector mounted on said first laser beam transmitter;
detecting said first and second laser beams with a laser beam receiver and receiving said first and second reference signals with a reference signal receiver, wherein said receivers are placed at a location at which the position is to be determined; and
determining the position of said laser beam receiver relative to said laser beam transmitters in the plane of the laser beams as the intersection of first and second lines extending in said plane from respective first and second laser beam transmitters and forming respective first and second angles with respect to said reference line, wherein said first angle is determined according to the ratio of the time interval between the detection of said first laser beam and the receipt of said first reference signal to the time interval defined by the period of rotation of said first laser beam, and wherein said second angle is determined according to the ratio of the time interval between the detection of said second laser beam and the receipt of said second reference signal to the time interval defined by the period of rotation of said second laser beam.

74. A surveying method comprising the steps of:

projecting first and second energy beams from two transmitters that are spaced apart, wherein each of said energy beams periodically sweeps in a plane across the area to be surveyed, and wherein said first laser beam defines a datum plane;

generating a first reference signal when said first energy beam is aligned with a first reference line;

generating a second reference signal when said second energy beam is aligned with a second reference line;

detecting said first and second energy beams with an energy beam receiver that is positioned at a location to be surveyed;

determining the elevation of the location to be surveyed according to the height at which said energy beam receiver detects said first laser beam;

receiving said first and second reference signals by a reference signal receiver; and determining the position of said energy beam receiver at the location to be surveyed relative to said reference lines and said transmitters according to the timing of detection of said energy beams by said energy beam receiver relative to the reception of said reference signals by said reference signal receiver, and recording the position and elevation of the location surveyed according to the measured position and elevation of said energy beam receiver.

75. A method for positioning markers at one or more locations to be marked, said method comprising the steps of:

projecting first and second energy beams from two respective transmitters that are spaced apart at known positions, wherein each of said energy beams periodically sweeps in a plane across the area to be marked;

defining the positions relative to said transmitters of the locations to be marked;

generating a first reference signal when said first energy beam is aligned with a first reference line;

generating a second reference signal when said second energy beam is aligned with a second reference line;

positioning an energy beam receiver near a location to be marked;

detecting said first and second energy beams with said energy beam receiver and receiving said first and second reference signals with a reference signal receiver;

determining the position of said energy beam receiver relative to said transmitters according to the timing of detection of said energy beams by said energy beam receiver relative to the reception of said reference signals by said reference signal receiver;

indicating a positional error of said energy beam receiver relative to the location to be marked;

repositioning said energy beam receiver until said positional error is substantially equal to zero; and marking the position of said energy beam receiver when said positional error is substantially equal to zero.

76. A method as recited in claim 75, wherein one of said energy beams is a datum beam that is projected in a datum plane, and wherein said method further comprises the steps of selecting a plurality of elevation-defining line segments along which the desired contour of the land has a constant slope, wherein each line segment has end points at which the position and desired elevation is known; measuring the elevation of the location to be marked according to the height at which said energy beam receiver detects said datum energy beam when said positional error is substantially equal to zero; determining the desired elevation of the location to be marked; and determining the elevation error of the grading implement according to the difference between the desired and measured elevations at the location to be marked.

77. A method as recited in claim 76 wherein said step of determining the desired elevation of the location to be marked includes the steps of finding two elevation-defining line segments near to and surrounding the location to be marked, finding the elevations of two points on the line segments, wherein said two points define a line through the location to be marked and wherein the elevation of a point located on a line segment is found by interpolating between the elevations of the two end points of that line segment, and interpolating between the elevations of said two points to determine the desired elevation of the location to be marked.

78. A method for sensing the position and elevation of a grading implement of an earth-moving vehicle and for determining an elevation error of the grading implement relative to a desired elevation, wherein the desired elevation of the grading implement at a particular position is the elevation that would allow the grading implement to produce a desired graded surface at that position, and wherein the elevation error is the difference between the actual and desired elevations of the grading implement, said method comprising the steps of:

defining the desired elevations of the grading implement as a function of the position of the grading implement throughout an area to be graded;

projecting a first energy beam that sweeps in a datum plane across the area to be graded;

generating a first reference signal when said first energy beam is aligned with a first reference line;

projecting a second energy beam that sweeps in a plane across the area to be graded, wherein said first and second energy beams are transmitted from transmitters that are positioned apart;

generating a second reference signal when said second energy beam is aligned with a second reference line;

detecting said first and second energy beams by an energy beam receiver that is coupled to a grading implement of an earth-moving vehicle for movement therewith;

receiving said first and second reference signals by a reference signal receiver that is coupled to the earth-moving vehicle for movement therewith;

determining the position of the grading implement relative to said transmitters according to the timing of the detection of said energy beams relative to the reception of said reference signals;

measuring the elevation of the grading implement according to the height at which said first energy beam strikes said energy beam receiver; and determining the elevation error of the grading implement according to the difference between the measured elevation and the desired elevation thereof.

79. A method as recited in claim 78, further comprising the step of automatically controlling the elevation of the grading implement to reduce said elevation error.

80. A method as recited in claim 78 further comprising the step of displaying to the operator of the earth-moving vehicle the elevation error.

81. A method as recited in claim 78, wherein the desired graded surface is inclined and the grading implement is sloped when producing the desired graded surface so that at any given position of the grading implement the desired slope thereof is a function of the orientation thereof, wherein the slope error is defined as the difference between the actual and desired slope of the grading implement, wherein said method further comprises the steps of determining the orientation and slope of the grading implement, determining the desired elevation and slope of the grading implement as a function of the measured position and orientation thereof, and determining the slope error of the grading implement from the difference between the measured slope and the desired slope thereof.

82. A method as recited in claim 81, further comprising the step of automatically controlling the elevation and slope of the grading implement to reduce said elevation and slope errors.

83. A method as recited in claim 81 further comprising the step of displaying to the operator of the earth-moving vehicle said elevation error and said slope error.

84. A method as recited in claim 78, wherein the desired graded surface is inclined and the grading implement is sloped when producing the desired graded surface, wherein said method further comprises the steps of determining the position and elevation of each side of the grading implement, determining the desired elevation for each side of the grading implement as a function of the measured position thereof, and determining the elevation error of each side of the grading implement according to the difference between the measured elevation and the desired elevation thereof.

85. A method as recited in claim 84 wherein said energy beam receiver comprises a first energy beam receiver that is coupled to one side of the grading implement for movement therewith and a second energy beam receiver coupled to the opposite side of the grading implement for movement therewith, and wherein said step of determining the position and elevation of each side of the grading implement includes the steps of detecting said first and second energy beams by each energy beam receiver, determining the position of each side of the grading implement according to the timing of the detection of said energy beams by each energy beam receiver relative to the reception of said reference signals, and measuring the elevation of each side of the grading implement according to the height at which one of said energy beams strikes each energy beam receiver.

86. A method as recited in claim 78 further comprising the step of sensing the lateral position of the grading implement and for determining a lateral positioning error of the grading implement relative to a desired lateral position.

87. A method as recited in claim 86 further comprising the step of automatically adjusting the lateral position of the grading implement relative to the earth-moving vehicle to reduce said lateral positioning error.

88. A method as recited in claim 86 further comprising the step of automatically steering the earth-moving vehicle to reduce said lateral positioning error.

89. A method for sensing the position and elevation of a grading implement of an earth-moving vehicle and for determining an elevation error of the grading implement relative to a desired elevation, wherein the desired elevation of the grading implement at a particular position is the elevation that would allow the grading implement to produce a desired graded surface at that position, and wherein the elevation error is the difference between the actual and desired elevations of the grading implement, said method comprising the steps of:

selecting a plurality of elevation-defining line segments along which the desired contour of the land has a constant slope, wherein each line segment has end points at which the position and desired elevation is known;

projecting a first energy beam that sweeps in a datum plane across the area to be graded, wherein all elevations are defined relative to said datum plane;

generating a first reference signal when said first energy beam is aligned with a first reference line;

projecting a second energy beam that sweeps in a plane across the area to be graded, wherein said first and second energy beams are transmitted from transmitters that are positioned apart at known positions relative to said elevation-defining line segments;

generating a second reference signal when said second energy beam is aligned with a second reference line;

detecting said first and second energy beams by an energy beam receiver that is coupled to a grading implement of an earth-moving vehicle for movement therewith;

receiving said first and second reference signals by a reference signal receiver that is coupled to the earth-moving vehicle for movement therewith;

determining the position of the grading implement relative to said transmitters according to the timing of the detection of said energy beams relative to the reception of said reference signals;

measuring the elevation of the grading implement according to the height at which said first energy beam strikes said energy beam receiver;

determining the desired elevation of the grading implement according to the steps of finding two elevation-defining line segments near to and surrounding the position of the grading implement, finding the elevations of two points on the line segments, wherein said two points define a line through the position of the grading implement and wherein the elevation of a point located on a line segment is found by interpolating between the elevations of the two end points of that line segment, and interpolating between the elevations of said two points to determine the desired elevation of the position of the grading implement; and determining an elevation error of the grading implement according to the difference between the measured elevation and the desired elevation thereof.

90. A method as recited in claim 89, further comprising the sep of automatically controlling the elevation of the grading implement to reduce said elevation error.

91. A method as recited in claim 89 further comprising the step of displaying said elevation error to the operator of the earth-moving vehicle.

* * * * *